United States Patent
Goldman et al.

(10) Patent No.: US 8,725,661 B1
(45) Date of Patent: May 13, 2014

(54) GROWTH AND USE OF SELF-TERMINATING PREDICTION TREES

(75) Inventors: Sally Goldman, Palo Alto, CA (US); Yoram Singer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/082,231

(22) Filed: Apr. 7, 2011

(51) Int. Cl.
*G06F 15/18* (2006.01)

(52) U.S. Cl.
USPC .......................................................... 706/12

(58) Field of Classification Search
None
See application file for complete search history.

(56) References Cited

PUBLICATIONS

Goldman et al., "Self-Pruning Prediction Trees", Feb. 10, 2010, pp. 1-2.*

\* cited by examiner

*Primary Examiner* — Jeffrey A Gaffin
*Assistant Examiner* — Paulinho E Smith
(74) *Attorney, Agent, or Firm* — Morris & Kamlay LLP

(57) ABSTRACT

Self-terminating prediction trees are a generalization of decision trees in which each node is associated with a real-valued prediction. Instead of having a separate pruning phase, a self-terminating tree may be constructed by applying various limits during tree growth that prevent nodes that add little or no additional decision power from being grown within the tree. The prediction tree is learned by performing a penalized empirical risk minimization task, based upon the use of prediction values and functional tree complexity. A separate pruning phase is not required, since the tree self-terminates further growth.

16 Claims, 13 Drawing Sheets

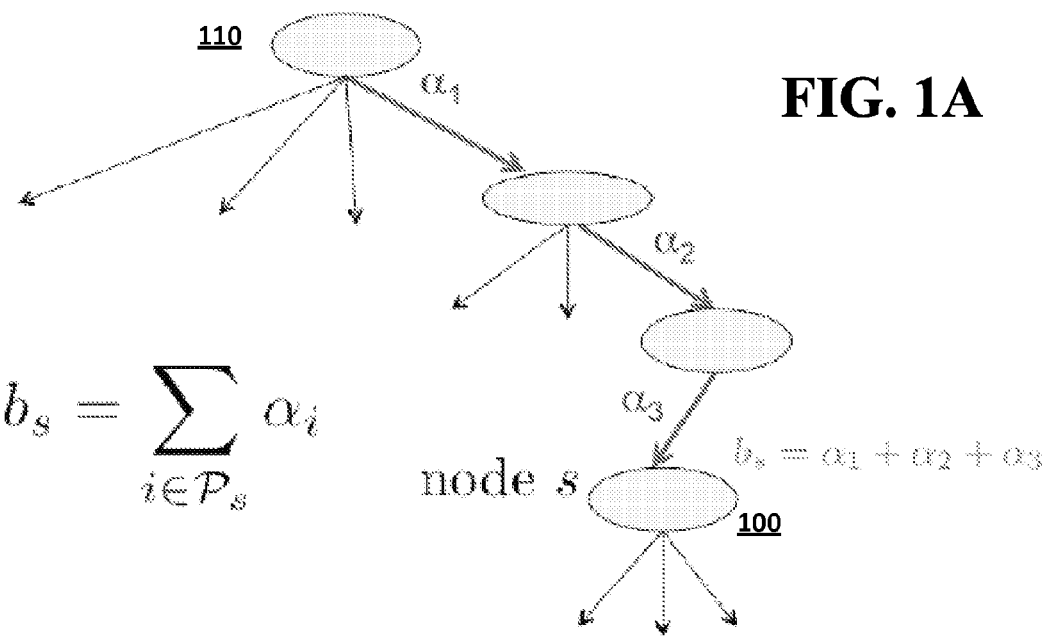
FIG. 1A
FIG. 1B
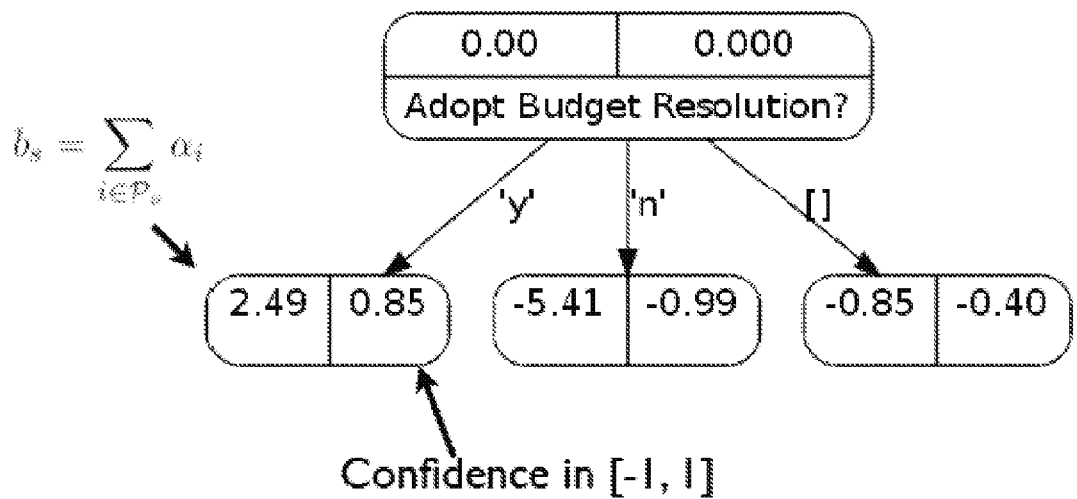

FIG. 8
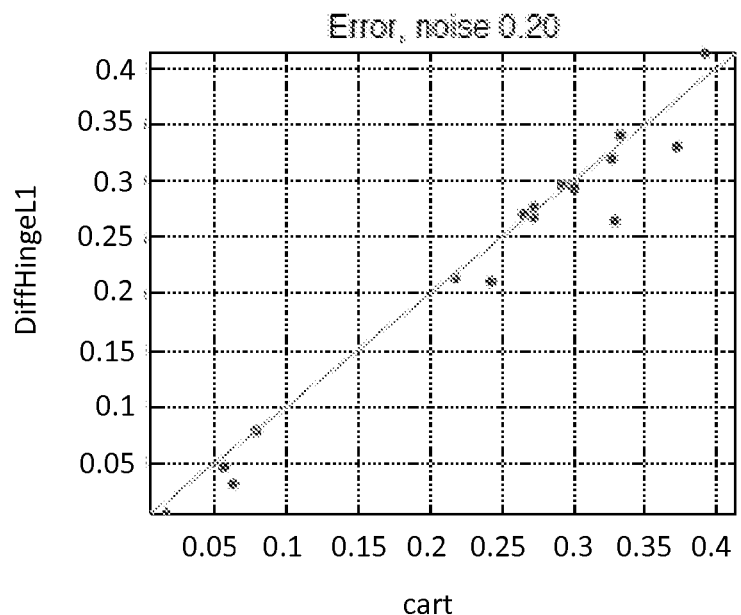
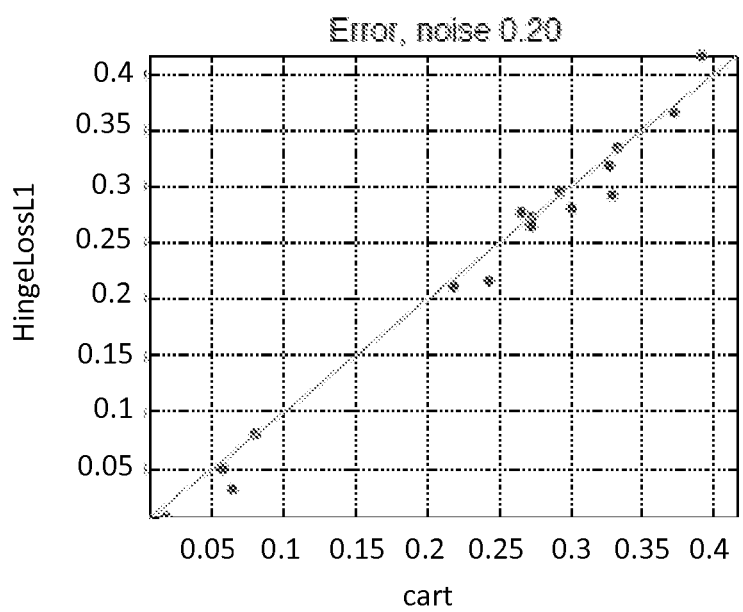

```
SolveDual(μ, ν, b, λ)
    Set γ̂ = UnconstrainedDualSolution(μ, ν, b)
    If ‖γ̂‖₁ < λ
      Return α = 0
    Let (τ, I⁺, I⁻) = ComputeKnots(μ, ν, b)
      Set σ_μ⁻ = 0, σ_μ⁺ = Σ_{j∈I⁺} μ_j, σ_ν⁻ = Σ_{j∈I⁻} ν_j, σ_ν⁺ = 0
    Construct knot sets: 𝒦 = 𝒦⁺ ∪ 𝒦⁻,
      𝒦⁺ = {τ_j : j ∉ I⁺, τ_j > 0}, 𝒦⁻ = {−τ_j : j ∉ I⁻, τ_j < 0}
    Let θ = ComputeTheta(σ_μ⁻, σ_μ⁺, σ_ν⁻, σ_ν⁺, b, λ)
    If |𝒦| > 0 and θ ≤ κ₁
      For i = 1 to |𝒦|
        Set j = index(κ_(i))
        If κ_(i) ∈ 𝒦⁺
          I⁺ = I⁺ ∪ {j}, σ_μ⁺ = σ_μ⁺ + μ_j, σ_ν⁺ = σ_ν⁺ + ν_j
        Else (so κ_(i) ∈ 𝒦⁻)
          I⁻ = I⁻ ∪ {j}, σ_μ⁻ = σ_μ⁻ + μ_j, σ_ν⁻ = σ_ν⁻ + ν_j
        Set θ = ComputeTheta(σ_μ⁻, σ_μ⁺, σ_ν⁻, σ_ν⁺, b, λ)
        If κ_(i+1) < θ ≤ κ_(i)
          Exit For Loop
    γ = ComputeGamma(μ, ν, b, θ, I⁺, I⁻)
    Return α = ComputeAlpha(μ, ν, b, γ)
```

FIG. 14

Classification Setting
  INPUT:
    $\mu = \{\mu_j = \sum_{y_i > 0} w_{ij}\}$,
    $\nu = \{\nu_j = \sum_{y_i < 0} w_{ij}\}$,
    bias $b = b_g(x) = \sum_{i \in F_g} \alpha_i$,
    regularization parameter $\lambda > 0$
  RETURN SolveDual($\mu, \nu, b, \lambda$)

Auxiliary Methods:
  LossDualUnconstrained($\mu, \nu, b$)
    RETURN $\{(\mu e^{-b} - \nu)/(1 + e^{-b})\}$ ComputeKnots($\mu, \nu, b$)
    LET $I^+ = \{j : \nu_j = 0\}$, $I^- = \{j : \mu_j = 0\}$
    LET $\tau = \{\tau_j = \log(\mu_j/\nu_j) - b : j \notin I^+ \cup I^-\}$
    RETURN $(\tau, I^+, I^-)$ ComputeTheta($\sigma_\mu^-, \sigma_\mu^+, \sigma_\nu^-, \sigma_\nu^+, b, \lambda$)
    LET $q_a = -(\sigma_\nu^+ + \sigma_\mu^- + \lambda)$
    LET $q_b = e^{-b}(\sigma_\mu^+ - \sigma_\nu^- - \lambda) + (\sigma_\nu^- - \sigma_\mu^+ - \lambda)/e^{-b}$
    LET $q_c = \sigma_\mu^+ + \sigma_\nu^- - \lambda$
    LET $v = (-q_b - \sqrt{q_b^2 - 4q_a q_c})/(2q_a)$
    IF $v < 1$
      RETURN $\infty$
    ELSE
      RETURN $\log(v)$ ComputeGamma($\mu, \nu, b, \theta, I^+, I^-$)
    FOR $j = 1$ to $k$
      $\gamma_j = \begin{cases} (\mu_j e^{-(b+\theta)} - \nu_j)/(1 + e^{-(b+\theta)}) & \text{if } j \in I^+ \\ (\mu_j e^{-b+\theta} - \nu_j)/(1 + e^{-b+\theta}) & \text{if } j \in I^- \\ 0 & \text{otherwise} \end{cases}$
    RETURN $\gamma$ ComputeAlpha($\mu, \nu, b, \gamma$)
    RETURN $\{\log\left(\frac{\mu - \gamma}{\nu + \gamma}\right) - b\}$

FIG. 15

```
Regression Setting
    INPUT:
        μ = {μⱼ = Σᵢ aᵢ,ⱼ},
        ν = {νⱼ = Σᵢ aᵢ,ⱼyᵢ},
        bias b = bₛ(x) = Σᵢ∈Dₛ αᵢ,
        regularization parameter λ > 0
    RETURN SolveDual(μ, ν, b, λ)

Auxillary Methods:
    LossDualUnconstrained(μ, ν, b)
        RETURN (ν − μb)

ComputeKnots(μ, ν, b)
        LET I⁺ = I⁻ = {}
        LET τ = {ν/μ − b}
        RETURN (τ, I⁺, I⁻)

ComputeTheta(σ⁻_μ, σ⁺_μ, σ⁻_ν, σ⁺_ν, b, λ)
        RETURN ((σ⁺_ν − σ⁻_ν − λ) − b(σ⁺_μ − σ⁻_μ))/(σ⁺_μ + σ⁻_μ)

ComputeGamma(μ, ν, b, θ, I⁺, I⁻)
        FOR j = 1 to k
            γⱼ = ⎧ νⱼ − μⱼ(b + θ)   if j ∈ I⁺
                 ⎨ νⱼ − μⱼ(b − θ)   if j ∈ I⁻
                 ⎩ 0                otherwise
        RETURN γ

ComputeAlpha(μ, ν, b, γ)
        RETURN (ν−γ/μ − b)
```

GROWTH AND USE OF SELF-TERMINATING PREDICTION TREES

BACKGROUND

Prediction trees can include a type of decision tree used in machine learning and data mining applications, among others. A prediction tree can be a decision tree in which each node has a real value associated with it, in addition to a branching variable as in a conventional decision tree. Prediction trees may be built or learned by using a first set of training data, which is then used to construct the decision and prediction values. A tree may be then applied against a second set of validation data, and the results are used to fine-tune the tree. Various computer-implemented techniques are known for growing and applying prediction trees to arbitrary data sets.

Conventional techniques for building prediction trees include two phases: a growing phase and a pruning phase. In the growing phase, nodes are added to the tree to match a known set of data, such as a training set. During this phase the tree may be overgrown, often to the point of fitting some noise in the data as well as real trends and patterns in the data. In an extreme case, for example, a tree can be constructed for a set of data in which each data point is associated with an individual leaf, i.e., the tree is fit exactly to the data set so that no two examples or data points result in the same end leaf or path through the tree. In some cases, such an overgrown tree may exactly fit known data, but could be ineffective or useless at predicting outcomes for other examples or data points.

To avoid the problem of overgrowing a tree, a second pruning phase may be employed in which sections of the tree that provide little or no additional predictive power are removed or collapsed. For example, a portion of the tree that fails to distinguish further among most of the examples that lead to that portion of the tree may be removed, thus terminating that portion of the tree at a higher node. Various pruning and validation techniques are known. For example, validation data may be applied to the tree to determine whether the tree provides equivalent or better predictions in the absence of certain nodes. Such nodes may then be pruned from the tree. Generally, the two-step growing and pruning process is computationally expensive.

Various other additions to tree learning are known. Some tree learning and application techniques associate a prediction with internal nodes of prediction trees; such techniques have been used for the estimation and learning of context trees for compression and classification. Measure-based regularization of prediction trees has been used to penalize a Hilbert norm of the gradient of a prediction function $f$. Some tree growing techniques have made use of self-controlled learning for online learning of self-bounded suffix trees. The learning procedure can be viewed as the task of estimating the parameters of a prediction tree of a fixed structure using the hinge loss for assessing the empirical risk along with an l2-norm variation penalty. In the context of online learning, this setting may lead to distilled analysis that implies sub-linear growth of the suffix tree. However, such approaches may not migrate directly to other settings. Various Bayesian approaches have also been used for tree induction and pruning.

BRIEF SUMMARY

According to an embodiment of the disclosed subject matter, a computer-implemented method of constructing a self-terminating prediction tree may include constructing a piecewise-continuous function representative of a prediction tree that maps an input space to real prediction values, determining a complexity function for the prediction tree based upon the variation norm of the real-valued prediction values, where the complexity function includes a regularizer that indicates when each child of a node should not be grown, and constructing a weighted risk function based upon the piecewise-continuous function. A variable that minimizes a combination of the complexity function and the weighted risk function for a root node may be identified, and a real value for each child node of the root node determined. The combination of the complexity function and the weighted risk function for each child node may be minimized, so as to obtain a real value for each child node of the child node. An input that includes a request for a prediction of a real value may be received from a user, and the tree may be traversed to obtain the requested prediction.

In an embodiment of the disclosed subject matter, a computer-implemented method of constructing a self-terminating prediction tree may include determining a complexity function for the prediction tree, constructing a weighted risk function for the prediction tree, and minimizing a combination of the complexity function and the weighted risk function to obtain a real-valued prediction for a plurality of nodes in the tree, where nodes having a real-valued prediction of zero are not added to the tree.

A system according to an embodiment of the disclosed subject matter may include a processor configured to construct a piecewise-continuous function representative of a prediction tree, where the function maps an input space to real prediction values, determine a complexity function for the prediction tree based upon the variation norm of the real-valued prediction values, that includes a regulator to indicate when a node should not be grown, and construct a weighted risk function based upon the piecewise-continuous function. The processor may determine a variable that minimizes a combination of the complexity function and the weighted risk function for the root node, determine a real value for each child node of the root node, and, for each child node of the root node having a non-zero real value, minimize the combination of the complexity function and the weighted risk function for the child node to obtain a real value for each child node of the child node. The system also may include an input configured to receive a request for a prediction of a real value based upon the prediction tree from a user, and an output configured to provide a prediction obtained by traversing the tree based upon the request.

A system according to an embodiment of the disclosed subject matter may include a processor configured to determine a complexity function for a prediction tree, construct a weighted risk function for the prediction tree, and minimize a combination of the complexity function and the weighted risk function to obtain a real-valued prediction for a plurality of nodes in the tree. Nodes in which the optimization method yields no change in the real-valued prediction relative to the parent need not be added to the tree.

In embodiments of the disclosed subject matter, methods and systems as disclosed above may be implemented on or in conjunction with a computer-readable medium that causes a processor to perform the disclosed methods and/or to implement the disclosed systems.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1A shows a schematic representation of an example prediction tree according to an embodiment of the disclosed subject matter.

FIG. 1B shows a specific example of a prediction tree according to an embodiment of the disclosed subject matter.

FIG. 8 shows experimental results in which uniform label noise is injected in 20% of the training and validation data according to an embodiment of the disclosed subject matter.

FIG. 12 shows techniques for node-based optimization techniques for classification and regression according to embodiments of the disclosed subject matter.

FIG. 13 shows an example technique for a generalized solution for a dual optimization method according to an embodiment of the disclosed subject matter.

FIG. 14 shows an example of node-level optimizations for a classification setting according to an embodiment of the disclosed subject matter.

FIG. 15 shows an example of node-level optimizations for a regression setting according to an embodiment of the disclosed subject matter.

DETAILED DESCRIPTION

Figure 2A:
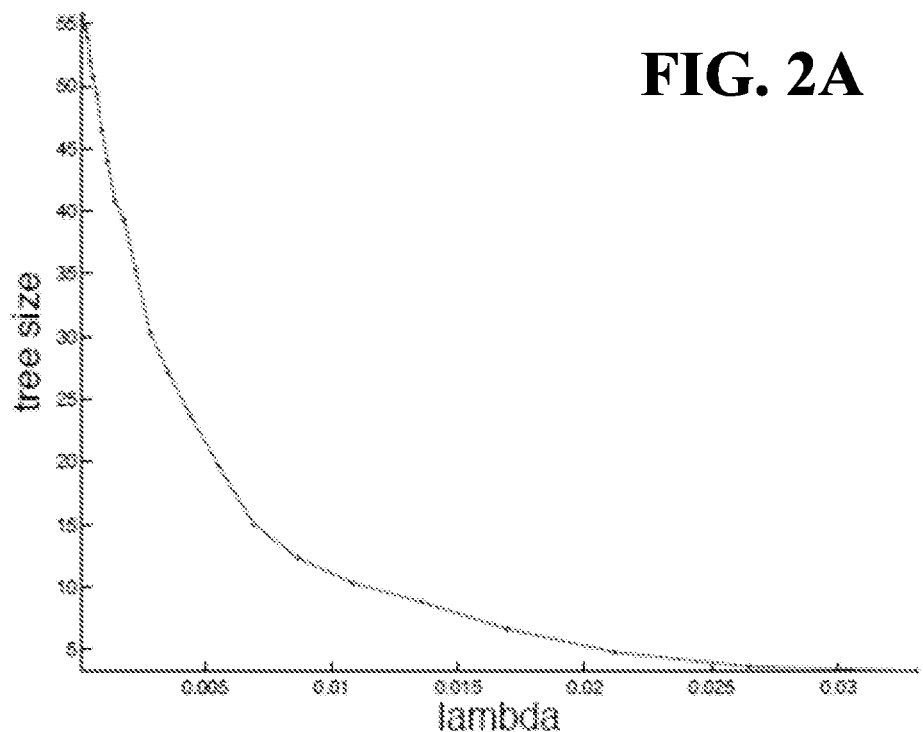
FIG. 2A shows an example correspondence between and tree size according to an embodiment of the disclosed subject matter.

It has been found that decision/prediction trees may be more efficiently created, without requiring a separate pruning phase, by using self-terminating prediction trees (SPTs) as disclosed herein. Self-terminating prediction trees are a generalization of decision trees in which each node is associated with a real-valued prediction. Instead of having a separate pruning phase, a self-terminating tree may be constructed by applying various limits during tree growth that prevent nodes that add little or no additional decision power from being grown within the tree. For example, a parent node that would only have a single child node that provides little or no additional information relative to the parent's real-value prediction value may not be grown.

In general, any tree or tree structure that could be created using a conventional growing/pruning technique also may be created using embodiments of the disclosed subject matter. However, whereas growing/pruning techniques normally expand either all children no children of a node in the tree, embodiments of the disclosed subject matter allow for development of the same or equivalent tree structures directly during tree growth.

According to an embodiment of the disclosed subject matter, an SPT can be viewed as a piecewise-constant function from an input space into a set of real values. Therefore, the children of a node in an SPT split the portion of the input feature space that is defined by the parent node into disjoint partitions, where each of the partitions is associated with a different prediction value. The complexity of the tree may be measured by the variation norm of the piecewise-constant function it induces.

SPTs may be applied to obtain prediction values for base inputs, such as prediction request and/or initial data supplied by a user of a system configured to generate and/or use the SPT. A base prediction for an input instance is formed by summing the individual predictions at the nodes traversed from the root node to a leaf by applying a sequence of branching predicates. The final predicted value may be obtained by applying a transfer function to the base prediction. For example, in the context of a probabilistic classification, a suitable transfer function may be the inverse logit function $1/(1+e^{-x})$. As another example, for a least squares regression the identity may be used as a suitable transfer function.

According to an embodiment, the logical problem of learning the prediction tree, such as by a computerized process, may be cast as a penalized empirical risk minimization task, based upon the use of prediction values and functional tree complexity described above. For instance, for prediction trees with the inverse logit transfer, a natural choice for the risk is the log-likelihood of the examples. Variation penalties based on $l_1$ and $l_\infty$ norms may be used. It has been found that these norms may promote sparse solutions that, in the context of SPTs, correspond to self-terminating of a tree-growing phase, meaning that no separate pruning phase is required. These norms also may facilitate parameter estimation of the prediction values.

Embodiments of the presently disclosed subject matter may be "backward compatible" with existing tree learning procedures. That is, other tree learning procedures may be used, and caused to self-terminate using the techniques disclosed herein. Efficient tree growing algorithms may be derived for a variety of loss functions, including some non-convex losses such as the difference of hinge functions, which may provide a tighter bound to the 0-1 loss.

For example, upon omitting the variation penalty, techniques disclosed herein may provide other growing criteria such as the information gain and the Gini index.

In an embodiment of the disclosed subject matter, an optimization method employing a dual representation of the (primal) penalized risk may be used, which may enable a unified treatment of different variational norms through their dual norms. A combined primal-dual procedure also may provide an algorithmic skeleton independent of the empirical loss.

Embodiments of the presently disclosed subject matter may diverge from conventional tree construction methods, which require two uncoupled phases of growing and then pruning the tree. The fact that the growing/induction phase is divorced from the pruning phase, poses aesthetic and computational challenges since two-phase tree induction methods often grow trees beyond the size necessary and, in some cases, over-grow the tree and result in fitting to noise in addition to data trends.

As disclosed above, a prediction tree is a generalization of a decision tree in which each node s is assigned a predicate $\pi_s$ that is used for branching, as well as a real value $\alpha_s$. FIG. 1A shows a schematic representation of an example prediction tree where each node s 100 has a real value $\alpha_s$ associated with it. The bias $b_s$ is the sum of real values from the root node 110 to the node s 100, and provides a confidence value for each prediction. Confidence values may be calculated for both internal nodes and for leaves. FIG. 1B shows a specific example of a prediction tree. As in FIG. 1A, the bias provides a confidence value for each prediction.

The use of techniques disclosed herein in binary predictions will now be described.

For any node s in the prediction tree, the path $P_s(x)$ is defined as the path of nodes from the root node to the node s when evaluating x. The sum of real values $b_s$ along the path is given by $b_s = \Sigma_{i \in P_s(x)} \alpha_i$.

Figure 2B:
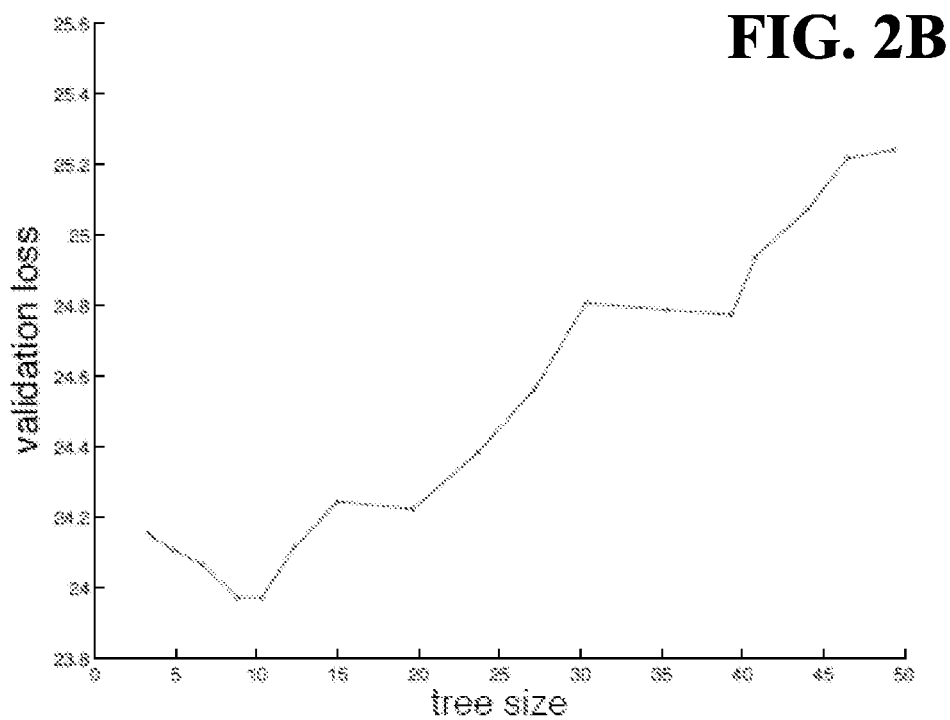
FIG. 2B shows validation loss at various tree sizes according to an embodiment of the disclosed subject matter.

For a given prediction tree T, the norm variation complexity $V^P(T)$ is defined as $\Sigma_{s \in T} \lambda(s) \|\alpha_{C(s)}\|_p$, where C(s) is the set of children of the node s and $\lambda(s)$ is a penalty for node s, e.g., the depth of node s. By convention, the real value $\alpha$ is set to 0 for null children. Thus, for p=1 and p=∞:
and $$V^1(t) = \sum_{s \in T} \lambda(s) \sum_{s' \in C(s)} |\alpha_{s'}| = \sum_{s \in T} \tilde{\lambda}(s) |\alpha_s|$$

$$V^\infty(t) = \sum_{s \in T} \lambda(s) \max_{s' \in C(s)} |\alpha_{s'}|$$

where $\tilde{\lambda}(s)$ is the penalty for the parent of node s. The penalties $\lambda(s)$ and $\tilde{\lambda}(s)$ may be used to encourage small decision trees. In general, the regularization constant $\lambda$ provides a control for the degree of sparsity of the prediction tree. For example, FIG. 2A shows an example correspondence between $\lambda$ and tree size according to embodiments of the presently disclosed subject matter. As shown, the tree size may be constrained by selecting an appropriate value of the regularization constant. For comparison, the validation loss at various tree sizes is shown in FIG. 2B. In some configurations, a more strict regularization constant, i.e., one that results in a smaller tree, also may increase the prediction error.

The use of the $l_\infty$ regularizer above may provide a sparse solution, in which children C(s) of a node s are zero. If the optimal solution is such that at least some $\alpha_{s'}$ for s'∈C(s) is non-zero, then the rest of the children can be non-zero as well without incurring further penalty.

As disclosed above, in an embodiment of the disclosed subject matter the tree learning process can be performed as a penalized empirical risk minimization task. To do so, the tree is modeled as a piecewise-continuous function and a risk function is applied. For example, a function $f_T$ may be defined for a prediction tree T. As a specific example, for an input x, $f_T(x)$ may be the sum of the $\alpha$ values along the path from the root of the tree T to the leaf reached by x. An empirical risk function $\hat{R}(L, F, w)$ may be defined for the function $f$ with loss L weighted by w≥0. Given examples $x_i$ and labels $$y_i, \hat{R}_n(L, f, w) := \sum_{i=1}^{n} w_i L(f(x_i), y_i).$$

Then the goal is to minimize the penalized weighted empirical risk (Equation 1):

$$\hat{R}_n(L, f, w) + V^p(T) = \sum_{i=1}^{n} w_i L(f(x_i), y_i)) + V^p(T).$$

Equation 1 incorporates sparsity-promoting regulation and, therefore, the learning technique encourages small trees that naturally terminate growth.

This technique greedily builds a multivariate prediction tree, but does not require a separate pruning phase as with conventional trees. Further, any "pruning" occurs at the finer granularity of edges, rather than at nodes. Because each node has an associated prediction, the value may be applied upon reaching a null child. The variable that minimizes Equation 1 by itself may be placed in the root, and then the same procedure may be recursively applied to all added nodes.

The optimization procedure used to select the variable to place at the node simultaneously determines the value $\alpha_j$ for each of the branches defined by the selected variable. For each branch for which s $\alpha_s$ is non-zero, the process is recursively applied. That is, embodiments of the presently disclosed subject matter may learn a prediction tree by first determining a variable that minimizes a combination of the complexity function and the weighted risk function at a root node, which also provides a real value for each child node of the root node. Similarly, these techniques may then determine a variable that minimizes a combination of the complexity function and the weighted risk function for each child node having a non-zero real value, which provides a real value for each child node of the root node. The process may be recursively applied for each child level having at least node with a non-zero real value.

Notably, the regularizer used in the objective determines when to stop growing the tree, i.e., when the tree will self-terminate. Furthermore, the regularization constant $\lambda$ provides a control for the degree of sparsity for the prediction tree, as shown and described with respect to FIG. 1 previously. Thus, embodiments of the presently disclosed subject matter may be used to boost shallow, non-fixed depth trees.

In general, as disclosed above, embodiments of the presently disclosed subject matter may be considered as including several components: associating each node of a prediction tree with a confidence value and a real-valued prediction, and learning the tree by minimizing a penalized empirical risk function. The risk function may be applied, for example, to a piecewise-continuous model of the tree. The complexity measure of the tree may be defined as the variation of the real-valued predictions. As disclosed in further detail below, various loss functions may be used with the penalized empirical risk tree learning technique.

In embodiments of the presently disclosed subject matter, node expansion may be performed through a variety of techniques. Techniques for learning sparse real $\alpha$ values for a node's children according to an embodiment of the disclosed subject matter will now be described. The predicate π to use within a node s is chosen by greedily selecting the predicate minimizing the penalized loss (1). More specifically, the loss obtained when s is associated with a k-ary predicate π may be derived, which in turn may create k children with values $\alpha_1, \ldots, \alpha_k$. In the following description, $w_{ij}$ is set equal to $w_i$ when example i follows branch j, and to 0 otherwise, and $b=b_s(x)$ where x is the example being considered.

In embodiments of the presently disclosed subject matter, techniques for addressing classification problems having labels in $\{-1, 1\}$ for a variety of loss functions may be used. For the following description, the values $\mu_j$ and $\nu_j$ are defined as:

$$\mu_j = \Sigma_{y_i=0} \omega_{ij}$$

$$\nu_j = \Sigma_{y_i<0} \omega_{ij}$$

For the logistic loss case, $L(f(x), y) = \log(1+e^{-yf(x)})$. To expand a node s into k children based upon splitting a particular feature, the following is minimized for $\alpha \in \mathfrak{R}^k$:

$$\sum_{j=1}^{k} \sum_{i=1}^{n} w_{ij} \log\left(1 + e^{-y_i(\alpha_j + b)}\right) + \lambda \|\alpha\|_p$$

In terms of ν and μ, this becomes (Equation 2):

$$\min_\alpha \sum_{j=1}^{k} \left[\mu_j \log\left(1 + e^{-(\alpha_j+b)}\right) + \nu_j \log\left(1 + e^{(\alpha_j+b)}\right)\right] + \lambda \|\alpha\|_p.$$

It can be shown that this generalizes a conventional greedy tree building using information gain by first determining the dual of Equation 2. H is used to denote the binary entropy and $1/p+1/q$ is set equal to 1, so that $l_q$ is dual to $l_p$. The dual problem to Equation 2 is then given by (Lemma 1)

$$\max_\gamma \sum_{j=1}^{k} (\mu_j + \nu_j) H\left(\frac{\mu_j - \gamma_j}{\mu_j + \nu_j}\right) - b\gamma_j \quad s.t. \quad \|\gamma\|_q \le \lambda.$$

Given the optimal dual variable γ, the optimal α is $\alpha_j = \log[(\mu_j-\gamma_j)/(\nu_j+\gamma_j)]-b$. Notably, when $\gamma_j=0$ for all j, this objective reduces to a standard information gain.

A general-purpose solution for the dual case may be obtained as described herein. In some embodiments of the presently disclosed subject matter, it may be useful to use a primal-based algorithm for an $l_1$ regularizer. To do so, the sub-gradient of Equation 2 is determined with respect to $\alpha_j$ and set to 0. So $$\frac{-\mu_j}{r_j^2+1} + \frac{\nu_j}{1/r_j^2+1} + \lambda s_j = 0$$

where $$s_j = \frac{\partial}{\partial \alpha_j} \|\alpha\|_1 \text{ and } r_j = \exp(\alpha_j+b)/2.$$

Thus, $r_j$ and $\alpha_j$ are:

$$r_j = \sqrt{(\mu_j - \lambda s_j)/(\nu_j + \lambda s_j)}$$

$$\alpha_j = \ln\left(\frac{\mu_j - \lambda s_j}{\nu_j + \lambda s_j}\right) - b.$$

The closed-form solution for $\alpha_j$ requires knowledge of $s_j$; however, the sign of $\alpha_j$ may be determined from known quantities:

when $\alpha_j > 0$ and setting $s_j=1$, $(\mu_j-\lambda)/(\nu_j+\lambda) > e^b$;
when $\alpha_j < 0$ and setting $s_j=-1$, $(\mu_j+\lambda) < (\nu_j-\lambda) < e^b$;
when $\alpha_j = 0$, $-1 \le s_j \le 1$;
when $-1 \le s_j$, $e^b \le (\mu_j+\lambda)/(\nu_j-\lambda)$; and
when $s_j \ge 1$, $(\mu_j \lambda)/(\nu_j+\lambda) \le e^b$ Thus, $s_j$ and $\alpha_j$ can be determined based upon only the known quantities μ, ν, λ, and b. A more complex method may be applied to all convex losses and for both $l_1$ and $l_\infty$ regularizers, as described in further detail herein.

Another loss of interest in an embodiment of the disclosed subject matter may be the hinge loss, for which $L(f(x), y) = \max\{0, 1-yf(x)\}$. The resulting optimization problem is then:

$$\min_\alpha \sum_{j=1}^{k} [\mu_j \max\{0, 1-(\alpha_j+b)\} + \nu_j \max\{0, 1+(\alpha_j+b)\}] + \lambda \|\alpha\|_p.$$

For p=1, the loss is piecewise-linear, so the objective may be determined at the three inflection points $\alpha=0$, $\alpha=1-b$, and $\alpha=-1-b$. The objective values may then be compared to find the minimum. The dual approach described herein may also be used, such as when $p=\infty$.

In an embodiment of the disclosed subject matter, another loss of interest may be the difference of hinge loss. For this loss function, $L(f(x), y) = dh(f(x) y)$, where dh is the difference of a hinge function at 0 and a hinge function at −1, and is defined as $dh(z) = \max\{0, 1-z\} - \max\{0, -z\}$. The associated optimization problem is $$\min_\alpha \sum_{j=1}^{k} [\mu_j dh(\alpha_j+b) + \nu_j dh(-(\alpha_j+b))] + \lambda \|\alpha\|_p.$$

For this loss, a solution may be obtained using the primal for both p=1 and $p=\infty$. When p=1, the loss is piecewise-linear as with the hinge loss, allowing for the objective to be determined at the inflection points $\alpha=0$, $\alpha=1-b$, $\alpha=-1-b$, and $\alpha=-b$. Similarly, when $p=\infty$, the loss is piecewise-linear with inflection points at $\alpha_j=0$, for $\alpha_j \in \{-r, r\}$, where $r=\min(|1-b|, |1+b|)$ and $\alpha_j \in \{1-b, -(1+b)\}$ for all j.

In an embodiment of the disclosed subject matter, an exponential loss function may be used. For exponential loss, $L(f(x),y) = \exp(-f(x) y)$, so the objective function is $$\min_\alpha \sum_{j=1}^{k} [\mu_j e^{-(\alpha_j+b)} + \nu_j e^{(\alpha_j+b)}] + \lambda \|\alpha\|_p.$$

For p=1, setting the sub-gradient with respect to $\alpha_j$ to zero yields $$-\mu_i \exp(-(\alpha_i+b)) + \nu_i \exp(\alpha_i+b) + \lambda \operatorname{sign}(\alpha_i) = 0.$$

The equation is a second-order polynomial in $e^{\alpha}$ and the solution is the root of the equation. Just as the logistic loss generalizes a standard information gain measure for tree growing, the exponential loss generalizes the Gini index.

In an embodiment of the disclosed subject matter, a squared loss may be applied for regression problems (where $y \in \Re$ ). The squared loss is $L(f(x), y) = \frac{1}{2}(f(x)-y)^2$. The technique then attempts to find $\alpha$ that minimizes $$\frac{1}{2}\sum_{i=1}^{n}\sum_{j=1}^{k} w_{ij}((\alpha_j + b) - y_i)^2 + \lambda\|\alpha\|_p =$$

$$C + \frac{1}{2}\sum_{i,j} w_{ij}(\alpha_j + b)^2 - \sum_{i,j} w_{ij}(\alpha_j + b)y_i + \lambda\|\alpha\|_p.$$

where C is a constant independent if $\alpha$. Defining $$\mu_j = \sum_{i=1}^{n} w_{ij}$$

and $$\upsilon_j = \sum_{i=1}^{n} w_{ij} y_i$$

gives the equivalent $$\min_{\alpha} \frac{1}{2}\sum_{j=1}^{k} \mu_j(\alpha_j + b)^2 - \sum_{j=1}^{k} \upsilon_j(\alpha_j + b) + \lambda\|\alpha\|_p.$$

The saddle point for $\alpha_j$ is defined by $w_j(\alpha_j+b)-\upsilon_j+\lambda \text{sign}(\alpha_j)=0$. So when $\alpha_j>0$, at the saddle point, $\alpha_j=(\upsilon_j-\lambda)/\mu_j-b$. This occurs if and only if $(\upsilon_j-\lambda)/\mu_j-b>0$, or equivalently when $$\upsilon_j/\mu_j-b>\lambda/\mu_j.$$

Similarly, when $\alpha_j<0$, $\alpha_j=(\upsilon_j+\lambda)/\mu_j-b$, if and only if $(\upsilon_j+\lambda)/\mu_j-b<0$, or equivalently when $$\upsilon_j/\mu_j-b<-\lambda/\mu_j.$$

If neither conditions hold, then $\alpha_j=0$.

Figure 12:
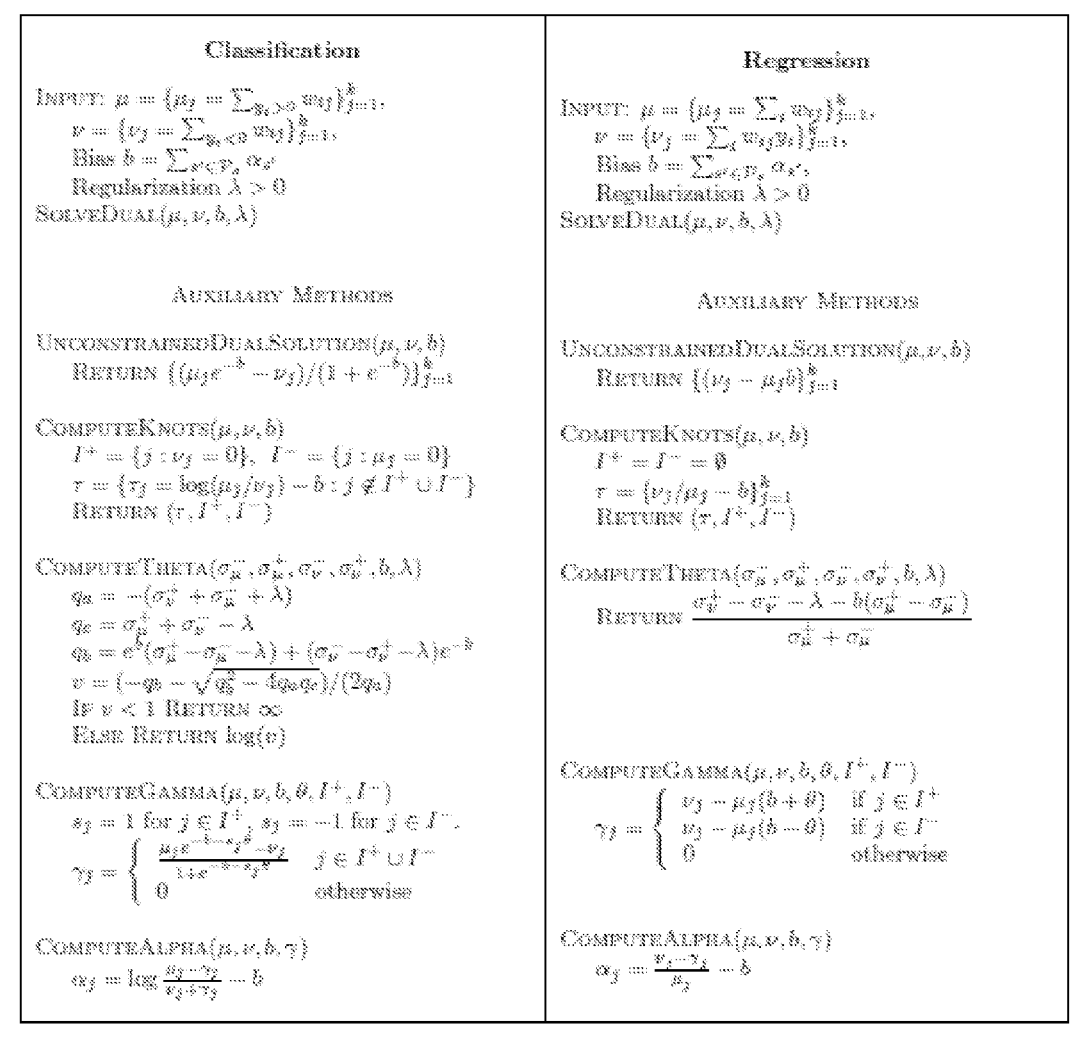

FIG. 12 shows node-based optimization techniques for classification and regression according to embodiments of the presently disclosed subject matter.

As previously indicated, in an embodiment of the disclosed subject matter a generalized solution to solving a dual optimization method for both classification and regression may be used. FIG. 13 shows an example technique for such a solution. FIG. 14 shows an example embodiment of the disclosed subject matter of node-level optimizations for a classification setting. FIG. 15 shows an example of node-level optimizations for a regression setting according to an embodiment of the disclosed subject matter. Further details regarding the dual technique, including derivation and solutions for an $l_1$ constraint, are provided in the appendix included herewith.

Figure 3:
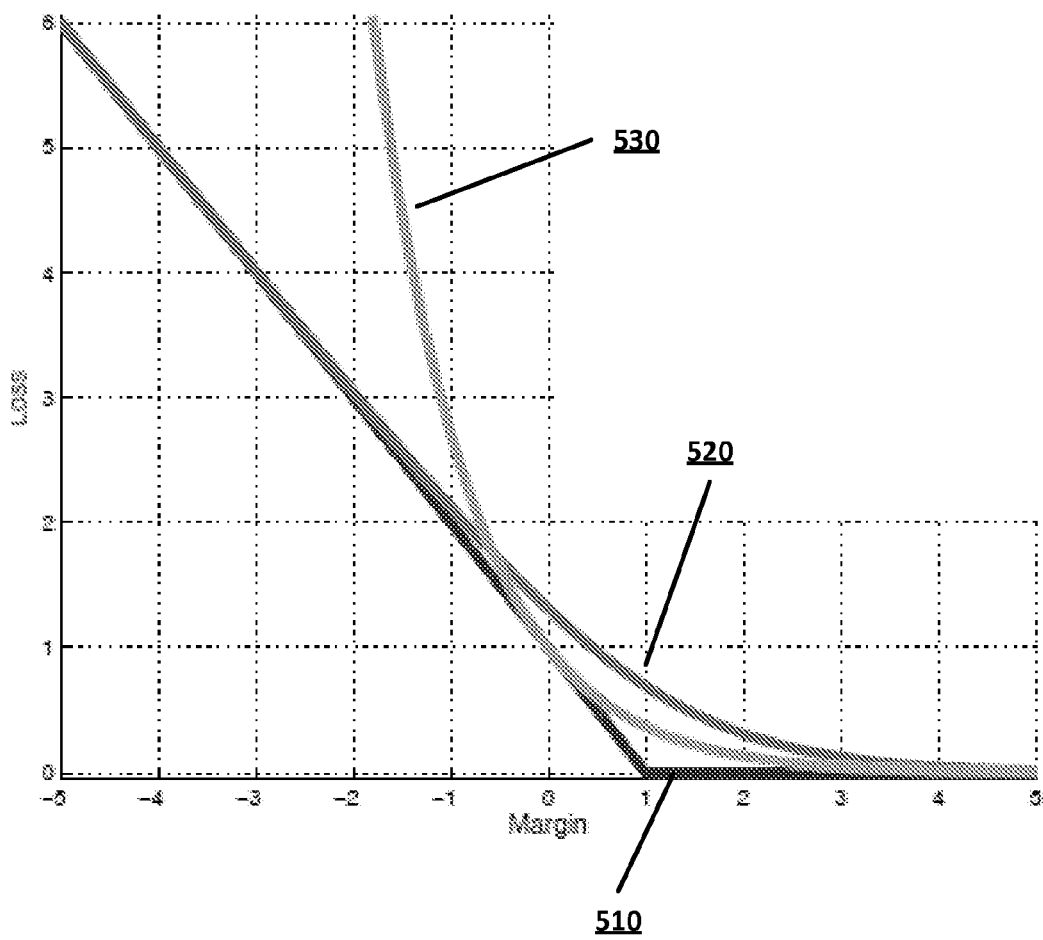
FIG. 3 shows example convex loss functions suitable for use with various embodiments of the disclosed subject matter.
Figure 4:
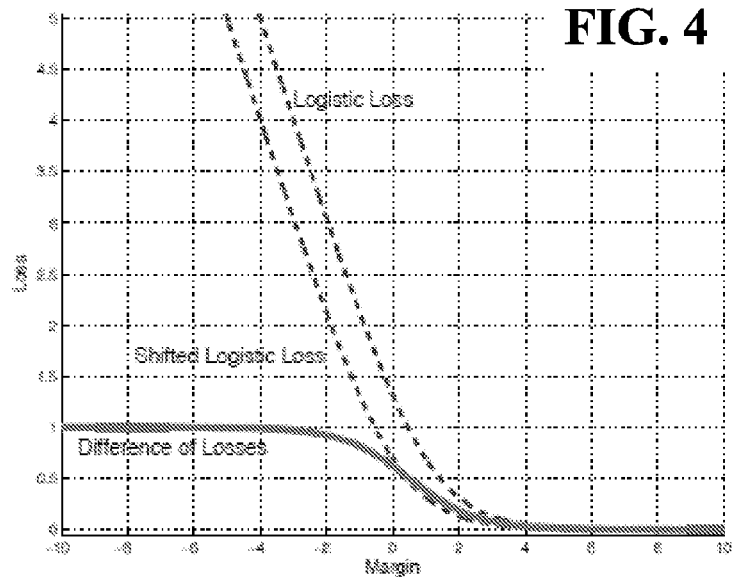
FIG. 4 shows an example logistic loss function suitable for use with various embodiments of the disclosed subject matter.
Figure 5:
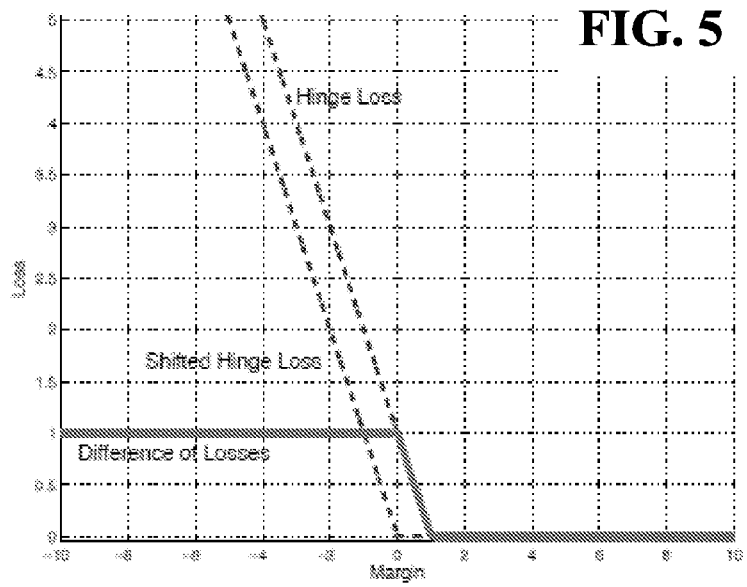
FIG. 5 shows an example difference of hinge loss function suitable for use with various embodiments of the disclosed subject matter.

As disclosed above, a variety of loss functions may be used, including convex loss functions. FIG. 3 shows example convex loss functions suitable for use with embodiments of the presently disclosed subject matter. Example hinge 510, logistic 520, and exponential 530 functions are shown. FIGS. 4-5 show example non-convex loss functions suitable for use with embodiments of the presently disclosed subject matter, including the difference of logistic loss (4) and difference of hinge loss (5) functions. It will be understood that the specific functions shown are illustrative only, and other variations and other loss functions may be used.

In an embodiment of the presently disclosed subject matter, the standard University of California-Irvine (UCI) data sets as commonly used in the field were used to grow and test a self-terminating tree. The results obtained with this embodiment demonstrate that the self-terminating tree techniques disclosed herein provide results competitive with a sophisticated Cart implementation that uses validation data in a post-pruning process. In contrast, embodiments of the presently disclosed subject matter allow for trees to self-terminate during the growing phase, with validation data only needed to select the value of 2. To obtain a standard deviation, the standard UCI training data was used, with $\frac{1}{6}$ of the training data used as test data. The remaining $\frac{5}{6}$ was provided as training data (with a fraction set aside as designated by the algorithm for cross validation). The classification results were averaged over 200 repetitions of this process, and the results for regression averaged over 50 repetitions. The results are shown below:

| Data Set | Cart | LogLoss $l_1$ | DiffHinge $l_1$ | HingeLoss $l_1$ | HingeLoss $l_\infty$ |
| --- | --- | --- | --- | --- | --- |
| breast-cancer | 0.297 ± 0.059 | 0.286 ± 0.061 | 0.310 ± 0.062 | 0.309 ± 0.062 | 0.324 ± 0.057 |
| breast-w | 0.063 ± 0.022 | 0.089 ± 0.026 | 0.061 ± 0.021 | 0.061 ± 0.021 | 0.052 ± 0.019 |
| credit-g | 0.269 ± 0.032 | 0.283 ± 0.036 | 0.288 ± 0.031 | 0.288 ± 0.031 | 0.289 ± 0.031 |
| diabetes | 0.259 ± 0.037 | 0.248 ± 0.033 | 0.261 ± 0.033 | 0.261 ± 0.033 | 0.261 ± 0.033 |
| haberman | 0.271 ± 0.062 | 0.284 ± 0.068 | 0.254 ± 0.061 | 0.254 ± 0.061 | 0.251 ± 0.063 |
| heart-c | 0.225 ± 0.058 | 0.249 ± 0.059 | 0.274 ± 0.050 | 0.274 ± 0.050 | 0.275 ± 0.030 |
| heart-h | 0.212 ± 0.050 | 0.225 ± 0.055 | 0.199 ± 0.052 | 0.199 ± 0.052 | 0.198 ± 0.053 |
| heart-statlog | 0.223 ± 0.061 | 0.244 ± 0.061 | 0.263 ± 0.057 | 0.263 ± 0.058 | 0.265 ± 0.057 |
| hepatitis | 0.202 ± 0.079 | 0.215 ± 0.078 | 0.201 ± 0.072 | 0.201 ± 0.072 | 0.201 ± 0.072 |
| labor | 0.251 ± 0.135 | 0.273 ± 0.118 | 0.220 ± 0.127 | 0.223 ± 0.127 | 0.236 ± 0.129 |
| liver-disorders | 0.350 ± 0.057 | 0.344 ± 0.061 | 0.354 ± 0.072 | 0.334 ± 0.072 | 0.354 ± 0.072 |
| lung-cancer | 0.186 ± 0.201 | 0.234 ± 0.189 | 0.148 ± 0.186 | 0.148 ± 0.186 | 0.148 ± 0.186 |
| solar-flare-1 | 0.025 ± 0.021 | 0.022 ± 0.019 | 0.023 ± 0.019 | 0.023 ± 0.019 | 0.022 ± 0.019 |
| solar-flare-2 | 0.005 ± 0.005 | 0.004 ± 0.004 | 0.005 ± 0.004 | 0.005 ± 0.004 | 0.005 ± 0.005 |
| sonar | 0.266 ± 0.075 | 0.281 ± 0.074 | 0.285 ± 0.076 | 0.285 ± 0.076 | 0.285 ± 0.076 |
| vote | 0.051 ± 0.024 | 0.048 ± 0.024 | 0.043 ± 0.022 | 0.043 ± 0.022 | 0.043 ± 0.022 |

Figure 6:
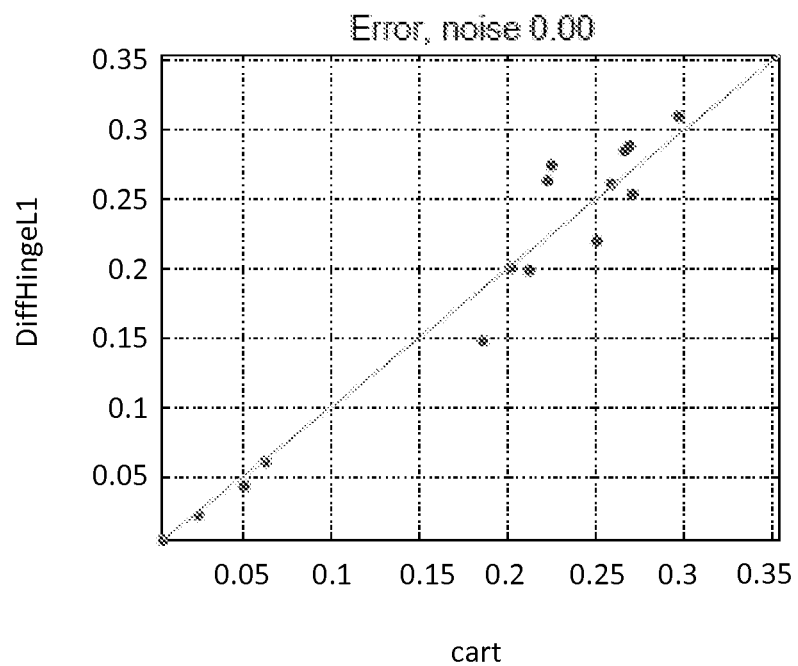
FIG. 6 shows a comparison of the difference of hinge loss optimizers according to an embodiment of the disclosed subject matter with Cart results.
Figure 7:
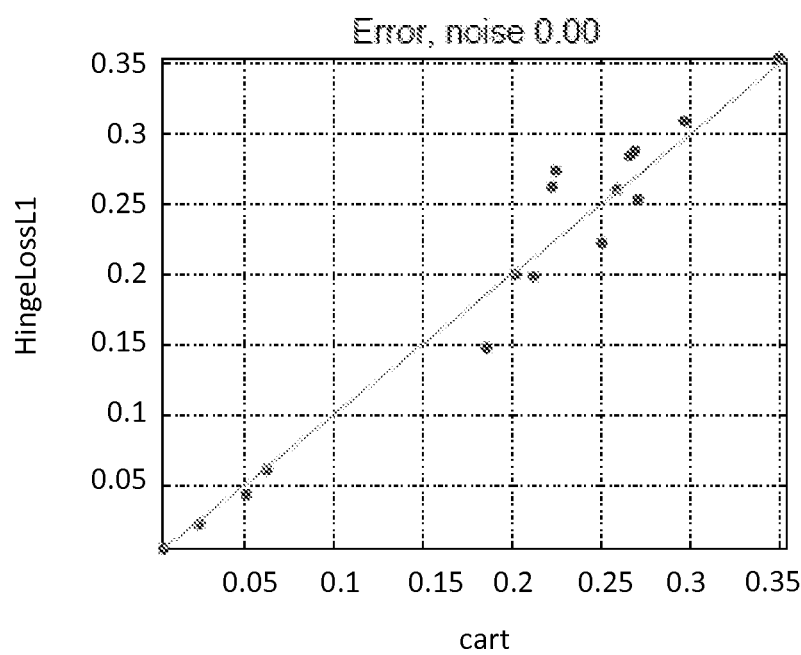
FIG. 7 shows a comparison of the hinge loss optimizers according to an embodiment of the disclosed subject matter with Cart results.
Figure 9:
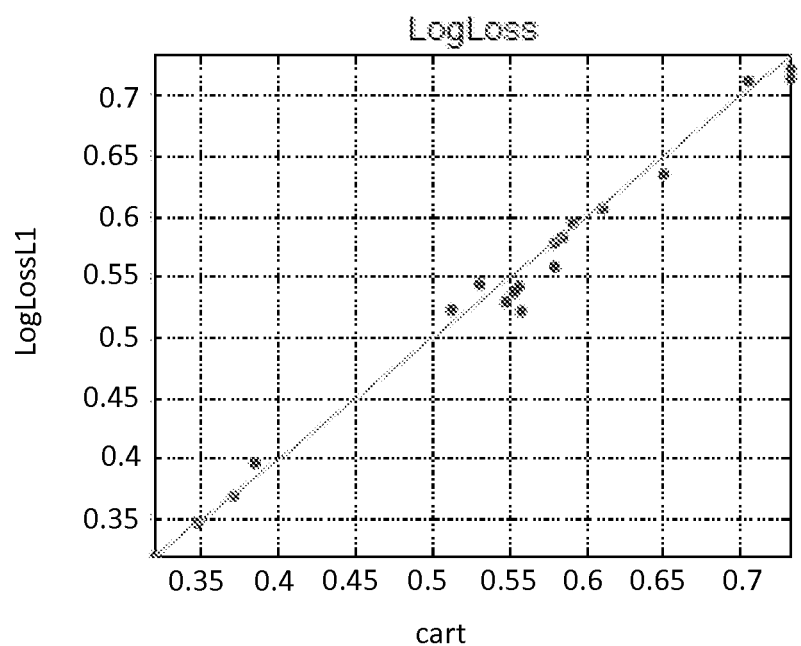
FIG. 9 shows a scatter plot comparing the log loss between Cart and the log loss optimizer with an $l_1$ regularizer according to an embodiment of the disclosed subject matter.

This shows that classification errors obtained by embodiments of the presently disclosed subject matter are comparable to known Cart results. As an alternate view, FIGS. 6-7 compare the hinge loss and difference of hinge loss optimizers according to embodiments of the presently disclosed subject matter with Cart results in a scatter plot. The techniques disclosed herein are naturally suited to making binary predictions and, because the optimization technique itself is based on minimizing a given loss function, it is appropriate that the disclosed techniques perform well when compared with Cart with respect to the loss being optimized. FIG. 9 shows a scatter plot comparing the log loss between Cart (using the confidence measure as its real-valued prediction), and the log loss optimizer with an $l_1$ regularizer according to embodiments of the presently disclosed subject matter.

One reason to consider the hinge loss and/or the difference of hinge loss is that these both better approximate the 0-1 loss, and as such should be more robust to classification errors. FIG. 8 and the following table present data from embodiments of the presently disclosed subject matter in which uniform label noise has been injected in 20% of the training and validation data.

Figure 10:
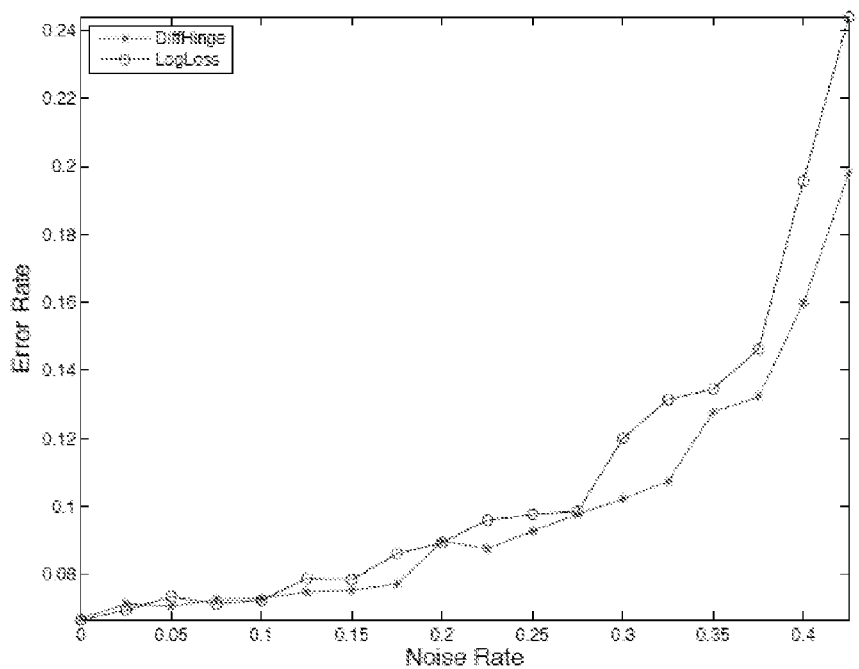
FIG. 10 shows a plot of error rates for various noise rates for the difference of hinge and log loss functions according to embodiments of the disclosed subject matter.

FIG. 10 shows a plot of error rates for various noise rates for the difference of hinge and log loss functions.

Embodiments of the presently disclosed subject matter also may be extended and generalized to multiclass problems. For example, some embodiments of the presently disclosed subject matter may provide techniques to solve multiclass problems using an $l_1$ regularizer at the node level. Using this restriction, an estimation procedure for each child of a node may be individually performed. A derivation of an example multiclass technique and solution according to an embodiment of the presently disclosed subject matter is disclosed in the appendix provided herewith.

Embodiments of the presently disclosed subject matter may be used to construct and use self-terminating trees in a variety of contexts. For example, self-terminating trees may be used to automatically classify or rank various items within a computer system. Specific examples include assigning a likelihood that a file is corrupt, identifying a desired file or component, ranking cost or value of a set of items, attributes, or conditions, assigning a probability that a user's provided identity is correct, determining a likelihood that a security measure has been breached, and the like, as well as various

| Data Set | Cart | LogLoss $l_1$ | DiffHinge $l_1$ | HingeLoss $l_1$ | HingeLoss $l_\infty$ |
|---|---|---|---|---|---|
| breast-cancer | 0.327 ± 0.077 | 0.333 ± 0.073 | 0.320 ± 0.077 | 0.318 ± 0.068 | 0.325 ± 0.063 |
| breast-w | 0.080 ± 0.027 | 0.080 ± 0.028 | 0.079 ± 0.025 | 0.080 ± 0.026 | 0.076 ± 0.028 |
| credit-g | 0.293 ± 0.036 | 0.304 ± 0.041 | 0.296 ± 0.036 | 0.295 ± 0.034 | 0.297 ± 0.036 |
| diabetes | 0.272 ± 0.039 | 0.277 ± 0.042 | 0.268 ± 0.036 | 0.265 ± 0.036 | 0.263 ± 0.036 |
| haberman | 0.300 ± 0.070 | 0.319 ± 0.068 | 0.294 ± 0.068 | 0.281 ± 0.065 | 0.283 ± 0.073 |
| heart-c | 0.273 ± 0.068 | 0.276 ± 0.067 | 0.277 ± 0.067 | 0.273 ± 0.060 | 0.269 ± 0.065 |
| heart-h | 0.218 ± 0.064 | 0.230 ± 0.066 | 0.214 ± 0.057 | 0.211 ± 0.053 | 0.212 ± 0.057 |
| heart-statlog | 0.265 ± 0.075 | 0.281 ± 0.073 | 0.271 ± 0.065 | 0.277 ± 0.069 | 0.271 ± 0.071 |
| hepatitis | 0.243 ± 0.095 | 0.256 ± 0.100 | 0.211 ± 0.082 | 0.216 ± 0.084 | 0.216 ± 0.079 |
| labor | 0.329 ± 0.157 | 0.283 ± 0.158 | 0.265 ± 0.165 | 0.293 ± 0.166 | 0.290 ± 0.166 |
| liver-disorders | 0.391 ± 0.068 | 0.392 ± 0.069 | 0.413 ± 0.059 | 0.416 ± 0.063 | 0.406 ± 0.075 |
| lung-cancer | 0.372 ± 0.238 | 0.386 ± 0.225 | 0.330 ± 0.250 | 0.366 ± 0.260 | 0.349 ± 0.247 |
| solar-flare-1 | 0.064 ± 0.043 | 0.029 ± 0.029 | 0.032 ± 0.026 | 0.032 ± 0.028 | 0.031 ± 0.025 |
| solar-Rare-2 | 0.017 ± 0.016 | 0.005 ± 0.006 | 0.006 ± 0.006 | 0.007 ± 0.007 | 0.007 ± 0.007 |
| sonar | 0.333 ± 0.088 | 0.334 ± 0.089 | 0.340 ± 0.087 | 0.334 ± 0.087 | 0.327 ± 0.091 |
| vote | 0.057 ± 0.028 | 0.050 ± 0.027 | 0.018 ± 0.025 | 0.048 ± 0.025 | 0.048 ± 0.024 |

Since SPTs use empirical risk minimization with respect to a real-valued prediction associated with each node in the tree, it would be expected that as with minimizing the log loss, the techniques disclosed herein will perform well for regression as compared with Cart. The following table shows a comparison between Cart and SPTs according to embodiments of the presently disclosed subject matter using the squared loss with au $L_1$ regularizer. As expected, SPTs according to embodiments of the presently disclosed subject matter may significantly outperform Cart on these data sets.

| Data Set | Cart | SquaredLoss $l_1$ |
|---|---|---|
| abalone | 4.669 ± 0.368 | 2.553 ± 0.209 |
| autoMpg | 12.038 ± 3.560 | 6.613 ± 1.424 |
| breastTumor | 103 ± 16 | 53 ± 8 |
| cpu | 1322 ± 1772 | 4787 ± 5669 |
| diabetes_numeric | 0.625 ± 1.056 | 0.186 ± 0.073 |
| housing | 33.583 ± 73.934 | 9.290 ± 4.233 |
| kdd_coil | 208.685 ± 377.111 | 17.555 ± 11.409 |
| mbagrade | 0.123 ± 0.055 | 0.061 ± 0.024 |
| servo | 0.568 ± 0.454 | 0.349 ± 0.234 |
| vineyard | 13.995 ± 33.863 | 5.591 ± 2.833 |
| wisconsin | 2972 ± 7118 | 531 ± 88 | other ranking and/or classification applications. In these configurations, the real value at each node may provide, for example, an indication of whether a user is likely to perform a specific action, if an analysis of the user's history or attributes leads to that node of the tree. Each node may indicate an attribute the user may have, the value of which for the particular user indicates which branch or path through the tree should be followed. Thus, by applying a tree to a particular user, file, configuration, message, etc., the tree may provide a prediction that the user's data is inaccurate, that the file is corrupt, or the like.

Figure 16:
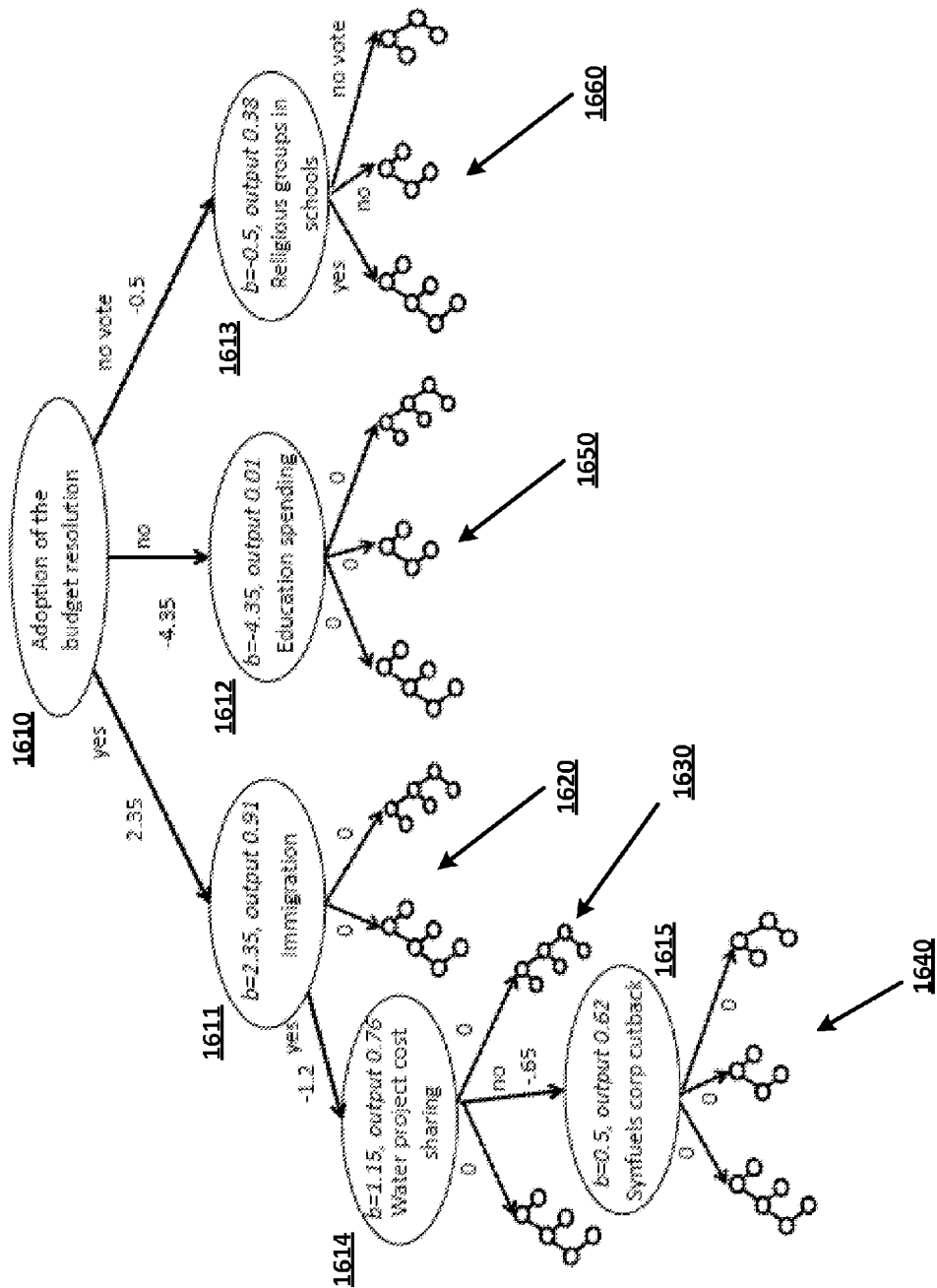
FIG. 16 shows an example prediction tree according to an embodiment of the disclosed subject matter.

FIG. 16 shows an example prediction tree for predicting the political party of a political representative based on the representative's votes. In the example, a prediction value (b, "output") closer to 1 indicates a higher likelihood or confidence that the representative is a Democrat, while a prediction value of 0 indicates a high confidence that the representative is a Republican. The bias b (equal to the sum of the real values α along the path to each node) is shown for each node.

The tree structure shown in FIG. 16 may be obtained according to embodiments of the disclosed subject matter by applying an optimization procedure that selects a variable to place at each node. As previously described, the optimization procedure will also determine the real values α for each branch at the node. Only branches with non-zero α values are grown. In the example, this process results in a prediction tree that includes the large nodes 1610, 1611, 1612, 1613, 1614, 1615, where each node indicates a vote (variable) that was found to improve the predictive power of the tree.

FIG. 16 also shows a prediction tree that may be obtained for the same value using a conventional growth/pruning technique, before it has been pruned. In such a technique, for each node typically either all children are expanded or no children are expanded. For example, the only child of the "immigration" vote 1611 found by an SPT technique as disclosed herein to have further predictive power is the "yes" branch" along the outside edge, as shown by the 0-valued α values for the other branches. However, a conventional growth/pruning technique may expand the "no" and "no vote" branches as well, resulting in the sub-tree structure 1620 as shown. Similarly, a growth/pruning technique may expand other branches 1630, 1640, 1650, 1660 that would not be grown by an SPT technique as disclosed herein. Although these additional nodes are shown much smaller for ease of illustration and understanding, it will be apparent to one of skill in the art that the intermediate fully-grown tree results in a much larger tree than the SPT techniques disclosed herein.

In a growth/pruning-type technique, these nodes may then be pruned based upon the performance of the full tree when applied to validation data. For example, the validation data may show that the additional branches 1620-1660 provide little or no additional predictive power, or that a tree without one or more of these branches performs better than the fully-grown tree that includes these branches. Thus, the branches 1620-1660 may be removed from the tree, resulting in a similar or identical tree to that obtained by an SPT technique as disclosed herein. The additional growth of branches that are later pruned 1620-1660, causes computational inefficiencies, especially for larger trees and data sets. Thus, embodiments of the disclosed subject matter may provide improved processing time relative to growth/pruning-type techniques for tree growth.

Figure 11:
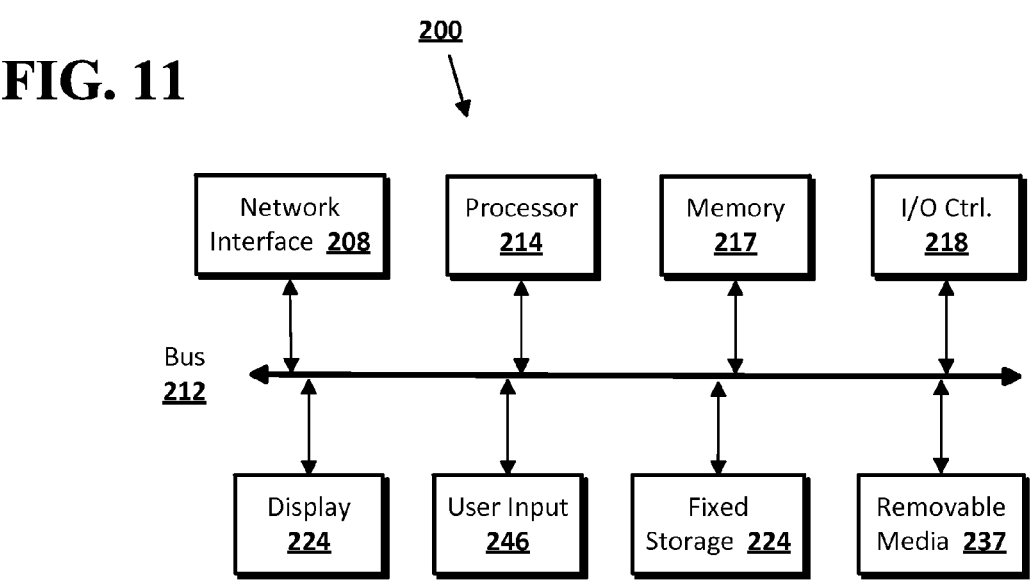
FIG. 11 shows an example device according to an embodiment of the disclosed subject matter.

Embodiments of the presently disclosed subject matter may be implemented in and used with a variety of device and network architectures. FIG. 11 is an example device 200 suitable for implementing embodiments of the presently disclosed subject matter. The computer system 200 includes a bus 212 which interconnects major subsystems of the computer system 210, such as a central processor 214, a system memory 217 (typically RAM, but which may also include ROM, flash RAM, or the like), an input/output controller 218, a user display 224, such as a display screen via a display adapter, a user input subsystem, which may include one or more controllers and associated user input devices such as a keyboard, mouse, and the like, fixed storage 224, such as a hard drive, flash storage, Fibre Channel network, SCSI device, and the like, and a removable media subsystem 237 operative to control and receive an optical disk, flash drive, and the like.

The bus 212 allows data communication between the central processor 214 and the system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer system 200 are generally stored on and accessed via a computer readable medium, such as a hard disk drive (e.g., fixed storage 224), an optical drive, floppy disk, or other storage medium 237.

The fixed storage 224 may be integral with the computer system 200 or may be separate and accessed through other interface systems. The network interface 208 may provide a direct connection to a remote server via a telephone link, to the Internet via an internet service provider (ISP), or a direct connection to a remote server via a direct network link to the Internet via a POP (point of presence) or other technique. The network interface 208 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown. The operation of a computer system such as that shown in FIG. 2 is readily known in the art and is not discussed in detail in this application. Code to implement the present disclosure can be stored in computer-readable storage media such as one or more of system memory 217, fixed storage 224, removable media 237, or on a remote storage location.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the method in accordance with embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the method in accordance with an embodiment of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

APPENDIX A

A General Purpose Dual Optimization Method

In this section, we give a single unified algorithm to solve the dual problem for both classification and regression problems. This unified algorithm relies on an ordering lemma that allows us to determine which of the dual variables are positive, negative and zero.

We first present the ordering lemma for the classification setting. First observe that introducing Lagrange multiplier $\theta \geq 0$ for the constraint $\|\gamma\|_1 \leq \lambda$ for the dual problem gives us Lagrangian $$\sum_{j=1}^{k} (\mu_j - \gamma_j) \log \frac{\mu_j - \gamma_j}{\mu_j + \nu_j} + (\nu_j + \gamma_j) \log \frac{\nu_j + \gamma_j}{\mu_j + \nu_j} + b\gamma_j + \theta(\|\gamma\|_1 - \lambda). \quad (1)$$

Lemma 1. Assume that $\mu_j > 0$ and $\nu_j > 0$. Define $\kappa_j := \log(\mu_j/\nu_j) - b$. Then $\kappa_j > \theta$ iff $\gamma_j > 0$, $\kappa_j < -\theta$ iff $\gamma_j < 0$, and $-\theta \leq \kappa_j \leq \theta$ iff $\gamma_j = 0$.

Proof. Let $s_j \in \partial |\gamma_j|$. Then the subgradient condition for optimality of the dual (1) is $$-\log(\mu_j - \gamma_j) + \log(\nu_j + \gamma_j) + b + \theta s_j = \log \frac{\nu_j + \gamma_j}{\mu_j - \gamma_j} + b + \theta s_j = 0. \quad (2)$$

Let $\kappa_j > \theta$ and assume that $\gamma_j \leq 0$. Then $s_j \in [-1, 0]$, and $$\log \frac{\mu_j - \gamma_j}{\nu_j + \gamma_j} - b \geq \log \frac{\mu_j}{\nu_j} - b = \kappa_j > \theta \geq \theta s_j,$$

contradicting the subgradient conditions for optimality. The case for $\kappa_j < -\theta$ is similar, and when $\kappa_j \in [-\theta, \theta]$, then setting $\gamma_j = 0$ gives $s_j = [-1, 1]$ and $$\log \frac{\mu_j - \gamma_j}{\nu_j + \gamma_j} - b = \kappa_j \in \theta s_j,$$

which satisfies the subgradient conditions for optimality.

For the converse, assume that $\gamma_j > 0$ is optimal, that is, it satisfies Eq. (2). Then $$\kappa_j - \theta > \log \frac{\mu_j - \gamma_j}{\nu_j + \gamma_j} - b - \theta = 0,$$

and the case for $\gamma_j < 0$ is similar. If $\gamma_j = 0$, then by Eq. (2) there is some $s_j \in [-1, 1]$ for which $\kappa_j + \theta s_j = 0$, or $\kappa_j \in [-\theta, \theta]$. □

Similar to the derivation for the logistic loss in, we have the following ordering lemma for the regression setting.

Lemma 2. The dual problem is $$\max_{\gamma} -\frac{1}{2} \left[ \sum_{j=1}^{k} \frac{1}{\mu_j} (\gamma_j - \nu_j)^2 + 2b\gamma_j \right] \text{ s.t. } \|\gamma\|_q \leq \lambda.$$

Further, given the optimal dual variable $\gamma$, the optimal $\alpha$ is $$\alpha_j = \frac{\nu_j - \gamma_j}{\mu_j} - b.$$

Again, a sorting algorithm using the unconstrained dual solution $\hat{\gamma}$ gives an efficient algorithm for solving Eq. (??). The problem is clearly simply truncation when p=1 (so q=∞). When p=∞ so that q=1, we consider the Lagrangian for the negative dual, adding multiplier $\theta \geq 0$ for the constraint that $\|\gamma\|_1 \leq \lambda$. We have $$\frac{1}{2} \sum_{j=1}^{k} \frac{(\gamma_j - \nu_j)^2}{\mu_j} + b \sum_{j=1}^{k} \gamma_j + \theta(\|\gamma\|_1 - \lambda). \quad (3)$$

The structure of the solution is given by the following lemma.
Lemma 3. Let $$\kappa_j = \frac{\nu_j}{\mu_j} - b.$$

Then $\kappa_j > \theta$ iff $\gamma_j > 0$, $\kappa_j < -\theta$ iff $\gamma_j > 0$, and $-\theta \leq \kappa_j \leq \theta$ iff $\gamma_j = 0$.

Proof. Let $s_j \in \partial |\gamma_j|$. Then the subgradient condition for optimality of the dual (3) is $$\frac{\gamma_j - \nu_j}{\mu_j} + b + \theta s_j = 0. \quad (4)$$

Let $\kappa_j > \theta$ and assume for the sake of contradiction that $\gamma_j \leq 0$. Then $s_j \in [-1, 0]$, and $$-\theta > \frac{-\nu_j}{\mu_j} + b \geq \frac{\gamma_j - \nu_j}{\mu_j} + b,$$

a contradiction to the fact that $$\frac{\gamma_j - \nu_j}{\mu_j} = \theta s_j \in \theta[-1, 0].$$

Conversely, Eq. (4) implies that when $\gamma_j > 0$, $$\kappa_j > \frac{v_j - \gamma_j}{\mu_j} - b = \theta > 0.$$

The proof for the case that $\kappa_j < -\theta$ is similar. When $\kappa_j \in [-\theta, \theta]$, there is some $s_j \in [-1, 1]$ such that $$\frac{-v_j}{\mu_j} + b + \theta s_j = 0,$$

so that Eq. (4) is satisfied. Conversely, if $\gamma_j = 0$ is optimal, then Eq. (4) implies $$0 \in \frac{v_j - \gamma_j}{\mu_j} - b + \theta[-1, 1] = \kappa_j + \theta[-1, 1].$$

We now derive our dual algorithm. We start with the simpler setting in which the dual is accompanied with $l_\infty$ constraints.

Solving the Dual with $l_\infty$ Constraints

When the primal problem uses $l_1$-regularization, the dual problem has an $l_\infty$ constraint. Let $\hat{\gamma}$ denote the unconstrained dual solution for either the regression or classification problem. Both objectives are separable, and the solutions are (see Eq. (2) and Eq. (4))

$$\hat{\gamma}_j = \mu_j - \frac{\mu_j + v_j}{1 + e^{-b}} = \frac{\mu_j e^{-b} - v_j}{1 + e^{-b}} \quad \text{[Logistic]} \quad (5)$$

$$\hat{\gamma}_j = v_j - \mu_j b \quad \text{[Regression]}.$$

Thus, with the $l_\infty$-constraint added, the solution $\gamma_j^* = \max\{\min\{\hat{\gamma}_j, \lambda\}, -\lambda\}$ is immediate.

Solving the Dual with $l_1$ Constraints

When $p = \infty$, $q = 1$ and the situation is slightly more complicated, as we now detail. Both problems have very similar structure, however. If $\|\hat{\gamma}\|_1 \leq \lambda$, then the KKT conditions for optimality imply that $\alpha = 0$ and no further work is needed. We thus focus on the case $\|\hat{\gamma}\|_1 > \lambda$.

Lemmas 1 and 3 suggest an efficient algorithm that iteratively considers candidate $\theta$ values. Had we known the optimal $\theta^*$, computing the optimal $\gamma_j$ is easy using Eq. (2) or Eq. (4). Thus, given $\theta$, let $\gamma(\theta)$ denote the optimal $\gamma$. We define index sets $I^-$, $I^0$, and $I^+$, containing indices for which $\gamma_j < 0$, $\gamma_j = 0$, and $\gamma_j > 0$, respectively. By Lemmas 1 and 3, it is clear that $I^- = \{j : \kappa_j < -\theta\}$, $I^+ = \{j : \kappa_j > \theta\}$, and $I^0 = \{j : \kappa_j \in [-\theta, \theta]\}$, allowing $\kappa_j = \pm \infty$.

Our algorithm essentially initializes $\theta$ at infinity, places all indices for which $|\kappa_j| < \infty$ into $I^0$, then shrinks $\theta$ until the index sets change. We call such change values knots, and can compute the optimal $\gamma(\theta)$ given $\theta$ using Lemma 1 and Eq. (2) or Lemma 3 and Eq. (4), depending on our setting. The algorithm terminates when $\|\gamma(\theta)\|_1 = \lambda$. Evidently, the only values of $\theta$ we need consider are the $\kappa_j$. Let $\kappa_{(1)}$ denote the largest knot value, $\kappa_{(2)}$ the second, etc. (we take $\kappa_{(0)} = \infty$), and note that setting $\theta = \kappa_{(i)}$ induces a partition of $\gamma$ into $I^+$, $I^0$, and $I^-$; for $\theta \in (\kappa_{(i)}, \kappa_{(i-1)})$, the index sets are constant. There must be some $i$ and setting of $\theta \in [\kappa_{(i)}, \kappa_{(i-1)})$ for which $\|\gamma(\theta)\|_1 = \lambda$, since our problems must satisfy the KKT conditions for optimality [?]. As noted earlier, if we knew the optimal $\theta$, we could immediately reconstruct $\gamma(\theta)$ and $\alpha$. On the other hand, if we have the correct partition of $\gamma$ into the index sets I, we can reconstruct the optimal $\theta$, which we now discuss.

Given a partition of $\gamma$ into $I^+$, $I^0$, and $I^-$, consider finding $\theta$. We begin with the logistic loss. Solving for $\gamma$ in Eq. (2), we have $$\gamma_j = \frac{\mu_j - v_j e^{b + \theta s_j}}{e^{b + \theta s_j} + 1}.$$

Let $t = e^\theta$. Then to find the $\theta$ such that $\|\gamma(\theta)\|_1 = \lambda$, assuming the partition of $\gamma$ into the index sets I is correct, we solve $$\sum_{j \in I^+} \frac{\mu_j - v_j e^b t}{e^b t + 1} - \sum_{j \in I^-} \frac{\mu_j - v_j e^b / t}{e^b / t + 1} = \lambda.$$

We can solve the above for $t$ as follows. Let $\sigma_\mu^+ = \Sigma_{j \in I^+} \mu_j$, $\sigma_\mu^- = \Sigma_{j \in I^-} \mu_j$, $\sigma_v^+ = \Sigma_{j \in I^+} v_j$, and $\sigma_v^- = \Sigma_{j \in I^-} v_j$. Then a bit of algebra yields $$-(\sigma_v^+ + \sigma_\mu^- + \lambda) t^2 + (e^b (\sigma_\mu^+ - \sigma_\mu^- - \lambda) + (\sigma_v^- - \sigma_v^+ - \lambda) e^{-b}) t + (\sigma_\mu^+ + \sigma_v^- - \lambda) = 0. \quad (6)$$

Clearly Eq. (6) is a quadratic in $t$, and we can solve for $\theta = \log t$ (where we take the positive root, and if there is none, the algorithm simply continues). For the regression problem, we see that solving for $\gamma_j$ in Eq. (4) gives $\gamma_j(\theta) = v_j - \mu_j(b + s_j \theta)$. Thus, setting the $\sigma$ values as before for logistic regression, we require that $$\sum_{j \in I^+} \gamma_j - \sum_{j \in I^-} \gamma_j = \sigma_v^+ - (b + \theta) \sigma_\mu^+ - \sigma_v^- + (b - \theta) \sigma_\mu^- = \lambda.$$

Solving for $\theta$ yields $$\theta = \frac{\sigma_v^+ - \sigma_v^- - b(\sigma_\mu^+ - \sigma_\mu^-) - \lambda}{\sigma_\mu^+ + \sigma_\mu^-} = \frac{\sum_{j : \gamma_j \neq 0} s_j(v_j - \mu_j b) - \lambda}{\sum_{j : \gamma_j \neq 0} \mu_j}. \quad (7)$$

Thus our algorithm proceeds by iterative considering knot values $\kappa_{(i)}$, partitioning $\gamma$ into $I^+$, $I^-$, and $I^0$, checking whether the $\theta$ induced by the partition falls in $[\kappa_{(i)}, \kappa_{(i-1)})$, and returning when such a $\theta$ satisfying the KKT conditions is found.

The key to the algorithm is to find the optimal partition of $\gamma$ into $I^+$, $I^-$, and $I^0$. Our algorithm maintains a set $I^+$ of indices $j$ for which we know that $\gamma_j > 0$. Initially, these are the $j$ for which $v = 0$. Likewise, we maintain a set $I^-$ of indices $j$ for which we know that $\gamma_j < 0$ which are initially the $j$ for which $\mu = 0$.

Our algorithm can be viewed as initializing our candidate for $\theta$ to $\infty$ which corresponds to the partition in which all indices $j$ not initially places in $I^+$ or $I^-$ have $\gamma_j = 0$. We then consider the knots in order, moving indices corresponding to positive knots into $I^+$, and indices corresponding to negative knots into $I^-$. Let $\kappa_i$ be the knot under consideration. We know that if the partition being considered is correct, then the value of $\theta$ for which $\Sigma_j |\gamma_j| = \lambda$ must satisfy $\kappa_{i-1} > \theta \geq \kappa_i$. Since, we process the candidates for $\theta$ from largest to smallest, it thus follows that once we reach a partition that produces $\theta > \kappa_i$ (equivalently, $v \geq e^{\kappa_i}$), we have the optimal partition and its corresponding value for $\theta$. FIG. 13 gives the algorithm in detail.

APPENDIX B

B. Multiclass Problems

We now describe an efficient algorithm to solve the multiclass problem when an $l_1$ regularizer is applied at the node level. Under this restriction, the estimation procedure for each child of a node s can be individually performed.

We focus in this section on the multiclass extension for the log loss. Recall that in a binary classification setting, each node s is associated with a bias value $b = \Sigma_{v \in p_s} \alpha_v$. When using the log loss as our empirical loss, we can also view b as a prior distribution over the target label where the probability of the label being 1 is $u = 1/(1+e^{-b})$, for all examples that reach the node s. In the multiclass setting we instead need to represent the label distribution as a probability vector, u, rather than a single scalar. Thus, we need to replace the single scalar $\alpha$ which is associated with each node, with a vector $\alpha$. The distribution induced over the labels takes the form $p_i \sim e^{b_i + \alpha_i}$. Our goal is to further endow the self-pruning property and promote solutions where the entire vector $\alpha$ is zero in the lack of strong empirical evidence. To do so, we use the $l_\infty$ regularization which promotes group sparsity.

For the remainder of this section we consider a node s with prior u and focus on a single branch from s for which q is the empirical distribution over the labels following that branch. Using the notation introduced earlier, we define $q_k = 1/\kappa \Sigma_{u:y_{i,j}=k} w_{i,j}$, where κ is a normalization constant which ensures that q is a proper distribution and $w_{i,j}$. Our goal is to determine the (posterior) distribution p of the labels for child node residing at the branch using the penalized empirical risk minimization framework we employed in the binary classification case. This posterior distribution becomes in turn the prior u as we proceed to perform the growing procedure at the child node. Formally, the multiclass penalized risk minimization for the logistic loss amount to minimizing $-\Sigma_i q_i \log p_i + \lambda \|\alpha\|_\infty$ where $p_i \sim e^{\alpha_i + b_i}$. Finding the optimal solution of this problem is not an easy task due to the $l_\infty$ penalty. We solve instead its Legendre dual, which is, $$\min_\gamma \sum_i ((q_i - \gamma_i) \log(q_i - \gamma_i) + \gamma_i \log u_i,$$

such $\|\gamma\|_1 \leq \lambda$ and $\Sigma_i \gamma_i = 0$. To solve the dual form we introduce a Lagrange multiplier $\theta \geq 0$ for the $l_1$ constraint and δ for the constraint that $\Sigma_i \gamma_i = 0$, and obtain the following Lagrangian, $$\min_\gamma \sum_i \left( (q_i - \gamma_i) \log(q_i - \gamma_i) + \gamma_i \log u_i + \theta(\|\gamma\|_1 - \lambda) + \delta \sum_i \gamma_i \right).$$

Denoting $s_i = \text{sign}(\gamma_i)$, and using the sub-gradient optimality condition with respect to γ yields that, $$p_i = q_i - \gamma_i = \begin{cases} u_i e^\theta / z & \gamma_i > 0 \\ u_i e^{-\theta} / z & \gamma_i < 0 \\ q_i & \gamma_i = 0, \end{cases} \quad (1)$$

where z is the standard normalization (partition function) which ensures that p is a proper distribution. Eq. (1) underscores the relation between γ and p. Specifically, Eq. (1) implies that when $\gamma_i > 0$, $u_i \leq p_i < q_i$, and for $\gamma_i < 0$, $u_i \geq p_i > q_i$. In words, the solution p lies between q and u where the lower and upper bounds on each coordinate in p depends on the relation between the corresponding components in q and u. This characterization facilitates the efficient procedure for finding the optimum which we describe in the sequel.

Let $I_+$ be the set of indices for which $\gamma_i > 0$, $I_-$ be the set of indices for which $\gamma_i < 0$, and $I_0$ be the set of indices for which $\gamma_i = 0$. Define $$Q_+ = \sum_{i \in I^+} q_i, \quad Q_- = \sum_{i \in I^-} q_i,$$

and similarly, $$U_+ = \sum_{i \in I^+} u_i, \quad U_- = \sum_{i \in I^-} u_i.$$

Combining Eq. (1) with the constraint that $\Sigma_i \gamma_i = 0$ (which stems from the requirement $\Sigma_i p_i = 1$) yields $$(e^\theta U_+ + e^{-\theta} U_-)/z = Q_+ + Q_-. \quad (2)$$

Similarly, combining Eq. (1) with the constraint $\Sigma_i |\gamma_i| = \lambda$ yields $$(-e^\theta U_+ + e^{-\theta} U_-)/z = \lambda - Q_+ + Q_-. \quad (3)$$

Combining the last two equalities gives a close form solution for θ and z, $$\theta = \frac{1}{2} \log\left(\frac{(Q_+ - \lambda/2)U_-}{(Q_- + \lambda/2)U_+}\right), \quad z = e^\theta U_+ + e^{-\theta} \frac{U_-}{Q_+ + Q_-}.$$

Our derivation is not over. In order to further characterize and find the solution we need to find the correct partition of the components of γ into the sets $I_+$, $I_-$, $I_0$.

From Eq. (1) it immediately follows that when $\gamma_i > 0$, $\log(p_i/u_i) + \log z = \theta$ and when $\gamma_i < 0$, $\log(p_i/u_i) + \log z = -\theta$. Furthermore, by applying the KKT conditions for optimality, the following property holds, $$|\log(q_i/u_i) + \log z| < \theta \Rightarrow \gamma_i = 0. \quad (4)$$

We now combine these properties to obtain an efficient algorithm for finding the optimal partition into $I_+$, $I_-$ and $I_0$ in the optimal solution. First observe we can sort the components according to the ratios $q_i/u_i$. Without loss of generality and for clarity of our derivation, let us assume that $q_1/u_1 \leq q_2/u_2 \leq \ldots \leq q_n/u_n$, where n is the number of different labels. From Eq. (4) we know that there must exist two indices r and s such that $1 \leq r < s \leq n$ and $q_r/u_r < 1$ and $q_s/u_s > 1$. In turn, these ratio properties imply that that for $j \leq r$, $\gamma_j < 0$, $\gamma_{r+1} = \ldots = \gamma_{s-1} = 0$, and for $j \geq s$, $\gamma_j > 0$. The next key observation is that had we were given the partition, then we could have computed the solution corresponding to that partition using the from the equations for z and θ. Finally, from Eq. (4), it is clear that a candidate partition is optimal iff $\theta > 0$ and for all i such that $|\log(q_i/u_i) + \log z| < \theta$, the value of $\gamma_i$ is zero.

The algorithm to find a partition of the indices into $I_+$, $I_-$ and $I_0$ proceeds as follows. Initially, we place all the indices in $I^0$. In an outer loop, going down and beginning at n, we add the next element $I_+$. We also maintain the sums $Q_\pm$ and $U_\pm$. These sums are used compute z and θ for each candidate partition in constant time. The sums are initially set to 0 and are updated in constant time as elements are moved from $I^0$ into either $I^+$ or $I^-$. It is easy to verify that for the optimal solution $Q_+>\lambda/2$. We can thus add elements to $I^+$ until this condition is met. Let us define $t_+=(Q_+-\lambda/2)/U_+)$. Next, for each candidate set $I_+$, we consider all feasible candidate sets $I_-$ by incremental adding elements, starting with index 1. We also define $t_-=(Q_-+\lambda/2)/U_-$. Note that we can rewrite $\theta=\frac{1}{2}t_+/t_-$. Since, if $t_+/t_-\leq 0$, the candidate partition that leads to these values is not feasible. Moreover, since $\theta>0$, $t_+$ must be greater than $t_-$. If either of the two conditions do not hold we the partition is not feasible and we can proceed to examine the next partition by adding one more element to $I_-$. If the two conditions hold, we can finally calculate candidate values for $\theta$ and in turn $z=(e^\theta U_++e^{-\theta}U_-)/(Q_++Q_-)$. Finally, if the 1-norm of the resulting solution is greater than $\lambda$, then we identified yet another infeasible partition. This condition as well can be verified in constant time since, $\|\gamma\|_1=Q_+-Q_-+(U_-e^{-\theta}-U_+e^\theta)/z$. Finally, as discussed above, the solution is optimal if and only if $|\log q_i/u_i+\log z|\leq 0$ for $i\in I^0$. This condition can be checked in constant time as well by simply examining the largest and smallest ratios $q_i/u_i$ for $i\in I_0$. The time complexity of this procedure for finding the optimum is $O(n^2)$ since we might need to examine all possible pairs $(r, s)$ such that $1\leq r<s\leq n$ and $q_r/u_r<1$ and $q_s/u_s>1$. Since typically the label set is not large and we can quickly disqualify candidate partitions we found that this procedure is in practice very fast.

The invention claimed is:

1. A computer-implemented method of constructing a self-terminating prediction tree, the method comprising:
   constructing a piecewise-continuous function representative of a prediction tree, the function mapping an input space to real prediction values;
   determining a complexity function for the prediction tree based upon the variation norm of the real-valued prediction values, the complexity function comprising a regularization constant that indicates when a node should not be grown, the regularization constant at each node of the tree depending upon the depth of the node in the tree;
   constructing a weighted risk function based upon the piecewise-continuous function; by a processor, for a root node, determining a variable that minimizes a combination of the complexity function and the weighted risk function;
   determining a real value for each child node of the root node;
   for each child node of the root node having a non-zero real value, minimizing the combination of the complexity function and the weighted risk function for the child node to obtain a real value for each child node of the child node;
   receiving an input from a user, the input comprising a request for a prediction of a real value based upon the prediction tree;
   traversing the tree based upon the request to obtain the prediction; and
   providing the prediction to a user.

2. A method as recited in claim 1, wherein the piecewise-continuous function for a path through the tree is equal to the sum of real values on the path from the root of the prediction tree to the leaf reached by the path.

3. A method as recited in claim 1, wherein the weighted risk function comprises a logistic loss function, a hinge loss function, a difference of hinge loss function, an exponential loss function, a squared loss function, or a combination thereof.

4. A computer-implemented method of constructing a self-terminating prediction tree, the method comprising:
   determining a complexity function for the prediction tree, the complexity function comprising a regularization constant that controls the sparsity of the tree, the regularization constant at each node of the tree depending upon the depth of the node in the tree;
   constructing a weighted risk function for the prediction tree; and
   by a processor, minimizing a combination of the complexity function and the weighted risk function to obtain a real-valued prediction for a plurality of nodes in the tree, wherein each node that produces no change in the real-valued prediction relative to its parent node is omitted from the tree.

5. A method as recited in claim 4, further comprising:
   receiving an input from a user, the input comprising a request for a prediction of a real value based upon the prediction tree;
   traversing the tree based upon the request to obtain the prediction; and
   providing the prediction to a user.

6. A method as recited in claim 4, wherein the weighted risk function comprises a logistic loss function, a hinge loss function, a difference of hinge loss function, an exponential loss function, a squared loss function, or a combination thereof.

7. A system comprising:
   a processor configured to:
   construct a piecewise-continuous function representative of a prediction tree, the function mapping an input space to real prediction values;
   determine a complexity function for the prediction tree based upon the variation norm of the real-valued prediction values, the complexity function comprising a regularizer that indicates when a node should not be grown and a regularization constant that controls the sparsity of the tree, the regularization constant at each node of the tree depending upon the depth of the node in the tree;
   construct a weighted risk function based upon the piecewise-continuous function;
   for a root node, determine a variable that minimizes a combination of the complexity function and the weighted risk function;
   determine a real value for each child node of the root node; and
   for each child node of the root node having a non-zero real value, minimize the combination of the complexity function and the weighted risk function for the child node to obtain a real value for each child node of the child node;
   an input configured to receive a request for a prediction of a real value based upon the prediction tree from a user; and
   an output configured to provide a prediction, the prediction obtained by traversing the tree based upon the request.

8. A system as recited in claim 7, wherein the weighted risk function comprises a logistic loss function, a hinge loss function, a difference of hinge loss function, an exponential loss function, a squared loss function, or a combination thereof.

9. A system comprising:
   a processor configured to:
   determine a complexity function for a prediction tree, the complexity function comprising a regularization constant that controls the sparsity of the tree, the regularization constant at each node of the tree depending upon the depth of the node in the tree;
   construct a weighted risk function for the prediction tree; and
   minimize a combination of the complexity function and the weighted risk function to obtain a real-valued prediction for a plurality of nodes in the tree, wherein each node that produces no change in the real-valued prediction relative to its parent node is omitted from the tree.

10. A system as recited in claim 9, further comprising:
an input configured to receive a request from a user for a prediction of a real value based upon the prediction tree;
the processor further configured to traverse the tree based upon the request to obtain the prediction.

11. A system as recited in claim 10, further comprising an output configured to provide the prediction to a user.

12. A system as recited in claim 9, wherein the weighted risk function comprises a logistic loss function, a hinge loss function, a difference of hinge loss function, an exponential loss function, a squared loss function, or a combination thereof.

13. A non-transitory computer-readable storage medium storing a plurality of instructions that cause a processor to perform a method comprising:
constructing a piecewise-continuous function representative of a prediction tree, the function mapping an input space to real prediction values;
determining a complexity function for the prediction tree based upon the variation norm of the real-valued prediction values, the complexity function comprising a regularizer that indicates when a node should not be grown and a regularization constant that controls the sparsity of the tree, the regularization constant at each node of the tree depending upon the depth of the node in the tree;
constructing a weighted risk function based upon the piecewise-continuous function;
by a processor, for a root node, determining a variable that minimizes a combination of the complexity function and the weighted risk function;
determining a real value for each child node of the root node;
for each child node of the root node having a non-zero real value, minimizing the combination of the complexity function and the weighted risk function for the child node to obtain a real value for each child node of the child node;

receiving an input from a user, the input comprising a request for a prediction of a real value based upon the prediction tree;
traversing the tree based upon the request to obtain the prediction; and
providing the prediction to a user.

14. A non-transitory computer-readable storage medium storing a plurality of instructions that cause a processor to perform a method comprising:
determining a complexity function for the prediction tree, the complexity function comprising a regularization constant that controls the sparsity of the tree, the regularization constant at each node of the tree depending upon the depth of the node in the tree;
constructing a weighted risk function for the prediction tree; and
by a processor, minimizing a combination of the complexity function and the weighted risk function to obtain a real-valued prediction for a plurality of nodes in the tree, wherein each node that produces no change in the real-valued prediction relative to its parent node is omitted from the tree.

15. A medium as recited in claim 14, the method further comprising:
receiving an input from a user, the input comprising a request for a prediction of a real value based upon the prediction tree;
traversing the tree based upon the request to obtain the prediction; and
providing the prediction to a user.

16. A medium as recited in claim 14, wherein the weighted risk function comprises a logistic loss function, a hinge loss function, a difference of hinge loss function, an exponential loss function, a squared loss function, or a combination thereof.

* * * * *